(12) United States Patent
Mizuno et al.

(10) Patent No.: US 8,433,085 B2
(45) Date of Patent: Apr. 30, 2013

(54) VIDEO AND AUDIO OUTPUT SYSTEM

(75) Inventors: Ko Mizuno, Osaka (JP); Toshihiko Date, Nara (JP)

(73) Assignee: Panasonic Corporation, Osaka (JP)

( * ) Notice: Subject to any disclaimer, the term of this patent is extended or adjusted under 35 U.S.C. 154(b) by 929 days.

(21) Appl. No.: 12/526,828

(22) PCT Filed: Dec. 17, 2008

(86) PCT No.: PCT/JP2008/003815
§ 371 (c)(1),
(2), (4) Date: Aug. 12, 2009

(87) PCT Pub. No.: WO2009/078176
PCT Pub. Date: Jun. 25, 2009

(65) Prior Publication Data
US 2010/0034403 A1 Feb. 11, 2010

(30) Foreign Application Priority Data

Dec. 19, 2007 (JP) ................................. 2007-326897

(51) Int. Cl.
*H04R 5/02* (2006.01)
(52) U.S. Cl.
USPC ............. 381/306; 381/300; 381/303; 381/17; 381/18; 348/736; 348/738
(58) Field of Classification Search .................. 381/306, 381/300, 303, 17, 18; 348/736, 738
See application file for complete search history.

(56) References Cited

U.S. PATENT DOCUMENTS

| | | | | |
|---|---|---|---|---|
| 6,633,648 | B1 * | 10/2003 | Bauck ............................ | 381/303 |
| 2005/0238196 | A1 | 10/2005 | Furuno et al. | |
| 2006/0072399 | A1 * | 4/2006 | Fujimoto et al. ............. | 369/47.1 |

FOREIGN PATENT DOCUMENTS

| | | | |
|---|---|---|---|
| JP | 63-269699 | | 11/1988 |
| JP | 63269699 | A * | 11/1988 |
| JP | 2-296499 | | 12/1990 |
| JP | 02296499 | A * | 12/1990 |
| JP | 11-187034 | | 7/1999 |
| JP | 11187034 | A * | 7/1999 |
| JP | 2004-23488 | | 1/2004 |
| JP | 2004-266604 | | 9/2004 |
| JP | 2005-79801 | | 3/2005 |
| JP | 2005079801 | A * | 3/2005 |

(Continued)

OTHER PUBLICATIONS

Iida, K. et al., *A Novel Head-Related Transfer Function Model Based on Spectral and Interaural Difference Cues*, WesPac IX, (Jun. 26-28, 2006).

(Continued)

*Primary Examiner* — Vivian Chin
*Assistant Examiner* — Paul Kim
(74) *Attorney, Agent, or Firm* — Wenderoth, Lind & Ponack, L.L.P.

(57) ABSTRACT

An acoustic signal output control section extracts, from an acoustic signal, a low-frequency-component acoustic signal and a high-frequency-component acoustic signal. A sound image localization processing filter section performs a sound image localization process on the low-frequency-component acoustic signal. The low-frequency-component acoustic signal having been subjected to the sound image localization process is outputted from loudspeakers in an AV rack loudspeaker apparatus. A television sound image localization processing filter section performs a sound image localization process on the high-frequency-component acoustic signal. The high-frequency-component acoustic signal having been subjected to the sound image localization process is outputted from loudspeakers in a television via HDMI communication sections.

18 Claims, 20 Drawing Sheets

FOREIGN PATENT DOCUMENTS

| | | | |
|---|---|---|---|
| JP | 2005-311988 | | 11/2005 |
| JP | 2006-148679 | | 6/2006 |
| JP | 2006148679 A | * | 6/2006 |
| JP | 2007-300519 | | 11/2007 |
| JP | 2007300519 A | * | 11/2007 |

OTHER PUBLICATIONS

International Search Report issued Apr. 7, 2009 in the International (PCT) Application of which the present application is the U.S. National Stage.

* cited by examiner

F I G. 1 9
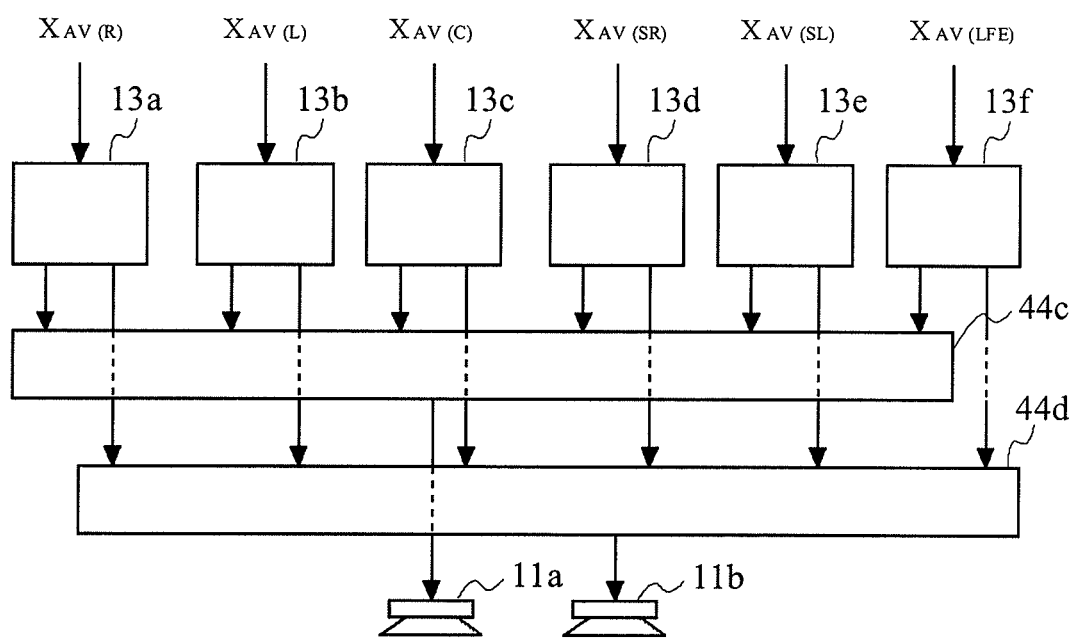

VIDEO AND AUDIO OUTPUT SYSTEM

BACKGROUND OF THE INVENTION

1. Technical Field

The present invention relates to a video and audio output system including an audio output device and a video and audio output device placed above the audio output device, for outputting an acoustic signal so as to localize a sound image of the acoustic signal at a predetermined position.

2. Background Art

In recent years, screens of flat-screen televisions such as plasma televisions, liquid crystal televisions, and the like have become larger, which makes it possible to enjoy strongly appealing video images at home. In the future, further thinning and weight saving as well as screen enlargement are demanded in order to realize a wall-hung television, for example. In addition, loudspeakers installed in the flat-screen televisions are also to be downsized and thinned. This narrows a range of the amplitude-frequency characteristics of a sound outputted from the loudspeaker, and moreover flatness thereof is impaired. In this manner, audio performance is sacrificed for improving video performance.

Thus proposed is an AV rack loudspeaker apparatus having a high-sound-quality loudspeaker installed in a television stand. This AV rack loudspeaker apparatus makes it possible to easily enjoy high-quality sounds without any need to separately provide an external high-sound-quality loudspeaker. In addition, this AV rack loudspeaker apparatus is equipped with a sound image localization control function for localizing a front channel sound in a direction beyond the location of the loudspeaker so that a viewer can enjoy more powerful sound effects.

However, in general use, the AV rack loudspeaker apparatus is placed on a floor and a television is mounted thereon. This causes a new problem that a sound image of a center channel or a sound image of the front channel subjected to a sound image localization control is localized near the floor so that a video image and a sound image appear at different heights, which causes a sense of incongruity.

As a technique for localizing a sound image at a desired position, a sound image localization control technique that corrects a head-related acoustic transfer function (hereinafter referred to as an HR transfer function) is conventionally in wide practical use. FIG. 23 shows diagrams illustrating the conventional sound image localization control technique by which an R-channel signal is processed and localized on the right side of a video display 105 at the same height as that of the video display 105. The diagram (a) of FIG. 23 shows a signal processing configuration, and the diagram (b) of FIG. 23 shows localization positions of sound images.

FIR filters 101a and 101b process the R-channel signal so as to correct the amplitude-phase characteristics to desired characteristics. Loudspeakers 102a and 102b convert electric signals outputted from the FIR filters 101a and 101b respectively into acoustic signals, and then output the signals. In order to localize a sound image at the position of a target sound image 103a with respect to a viewer 104 in FIG. 23, transfer functions G1 and G2 that satisfy the following Equation 1 are calculated, and coefficients whose processing characteristics are the transfer functions G1 and G2 are provided to the FIR filters 101a and 101b. Here, HR transfer functions for transfer from the loudspeaker 102a to the left and right ears of the viewer 104 are defined as C1 and C2. HR transfer functions for transfer from the loudspeaker 102b to the left and right ears of the viewer 104 are defined as C3 and C4. HR transfer functions for transfer from a loudspeaker that is supposedly placed at the position of the target sound image 103a to the left and right ears of the viewer 104 are defined as H1 and H2.

$$\begin{bmatrix} C_1 & C_3 \\ C_2 & C_4 \end{bmatrix} \begin{bmatrix} G_1 \\ G_2 \end{bmatrix} = \begin{bmatrix} H_1 \\ H_2 \end{bmatrix} \quad \text{[Equation 1]}$$

However, when the transfer functions G1 and G2 of the FIR filters 101a and 101b are fixed, a change in the HR transfer functions C1 to C4 resulting from a change in a viewing position of the viewer 104 causes a localization position of a sound image to shift from the position of the target sound image 103a. In particular, due to a change in phase-frequency characteristics of the HR transfer functions C1 to C4, a composite sound made up of audio outputs from both loudspeakers shows an extreme change in amplitude-frequency characteristics at both ears. Such a change in amplitude-frequency characteristics appears prominently in a high-frequency component having a short wavelength.

Meanwhile, extensive studies have been conventionally conducted on a causal relationship between sound image recognition and an HR transfer function. According to the studies, there is found that human beings grasp a lateral-direction angle of a sound image based on differences, in level and phase of an HR transfer function, between both ears, and grasp a height-direction angle of the sound image based on a shape of amplitude-frequency characteristics of the HR transfer function.

FIG. 24 shows an example of HR transfer functions of sound sources positioned at different heights. A sound source A is positioned 60 degrees horizontally right relative to a front direction of the viewer 104, and a sound source B is positioned 30 degrees vertically down from the sound source A (a diagram (a) of FIG. 24). Comparing between the sound source A and the sound source B with respect to the amplitude-frequency characteristics, it can be seen that their shapes largely differ in the frequency band higher than 1 kHz (a diagram (b) of FIG. 24). In particular, unique peak characteristics and notch characteristics appearing in the high frequency band of 4 kHz or higher are widely known as an important clue for recognition of a sound image height. In addition, Non-Patent Document 1 reports that two notch characteristics appearing in the frequency band of 4 kHz to 16 kHz are important clues for height localization or front-and-back localization of the front-direction sound.

Thus, a high-frequency component in the HR transfer function serves as the clue for recognition of the sound image height, but there is an problem that an error is likely to occur in Equation 1 and the sound image is not localized at a desired height. As shown in the diagram (b) of FIG. 23, for the viewer 104, a sound image is localized at a desired position with respect to the lateral direction. However, the viewer 104 cannot hear the unique characteristics of a high-frequency component, which serves as the clue for recognition of the sound image height, in the desired HR transfer functions H1 and H2. Instead, the viewer 104 hears the characteristics of the HR transfer functions of the loudspeakers 102a and 102b that are actually outputting audio. Therefore, with respect to the height direction, the sound image is undesirably localized at the height of the loudspeakers 102a and 102b (a sound image 103b).

As described above, according to the conventional sound image localization control technique, a sound image localization in the lateral direction can be realized, but the sound image cannot actually be localized at a height different from the height of the loudspeaker that outputs audio.

Patent Document 1 discloses a processing circuit that localizes a sound image at a position of a video monitor by using loudspeakers located at different heights. FIG. 25 is a diagram showing a conventional processing circuit 106 described in Patent Document 1. FIG. 25 illustrates an example in which a C-channel signal is localized at the position of the video monitor.

In FIG. 25, an equalizer 107 corrects the amplitude-frequency characteristics of a C-channel signal $C_{in}$. A band-pass filter 108 extracts, from an output from the equalizer 107, only components belonging to a predetermined frequency band. A band-elimination filter 109 extracts, from an output from the equalizer 107, components except components belonging to a predetermined frequency band. Amplifiers 110a to 110d amplify an L-channel signal $L_{in}$, an output from the band-pass filter 108, an output from the band-elimination filter 109, and an R-channel signal $R_{in}$ at predetermined gains, respectively. An adder 111a adds together an output from the amplifier 110a and an output from the amplifier 110b. An adder 111b adds together an output from the amplifier 110b and an output from the amplifier 110d.

An output from the adder 111a is, as an L-channel sound, outputted from a loudspeaker 102c placed on the left side of a video monitor 105. An output from the adder 111b is, as an R-channel sound, outputted from a loudspeaker 102e placed on the right side of the video monitor 105. An output from the amplifier 110c is, as a C-channel sound, outputted from a loudspeaker 102d placed on the upper side of the video monitor 105 (or a loudspeaker 102f placed on the lower side of the video monitor 105). A predetermined processing coefficient is provided to the equalizer 107 so as to make the viewer feel as if the front-direction C-channel loudspeaker 102d (or 102f) outputs sounds that are actually outputted from the L-channel loudspeaker 102c and the R-channel loudspeaker 102e located approximately at ±30 degrees. This processing coefficient is a coefficient for performing a process with the same amplitude characteristics as those of a transfer function obtained by dividing an HR transfer function for transfer from the C-channel loudspeaker 102d (or 102f) to the viewer by an HR transfer function for transfer from the L/R-channel loudspeakers 102c and 102e to the viewer.

Patent Document 1: Japanese Laid-Open Patent Publication No. 2004-266604

Non-Patent Document 1: Iida et al., "A novel head-related transfer function model based spectral and interaural difference cues", WESPAC9, September 2006

SUMMARY OF THE INVENTION

However, when adopting the conventional processing circuit 106 shown in FIG. 25, the loudspeakers 102c and 102e have to be placed at the same height as that of the video monitor 105. Thus, the processing circuit 106 is not applicable to an AV rack loudspeaker apparatus which is placed under a television. Even if the loudspeakers can be placed, it raises new problems that an extra installation space is required and wiring is complicated.

Moreover, the HR transfer function for transfer from the loudspeaker to the viewer 104 varies depending on a placement angle of the loudspeakers 102c and 102e. Therefore, in order to obtain an effect of localizing a sound image at the front by the process of the equalizer 107, it is necessary to measure an HR transfer function for each placement location and correct the processing characteristics of the equalizer 107 based on measurement data.

In addition, in the case where at least two of the loudspeakers 102c to 102f are used and a sound image localization control for the L-channel signal, the R-channel signal, and the like is performed by using a signal processing configuration shown in FIG. 23, it is necessary to correct FIR filters based on HR transfer function data that correspond to a placement location, which imposes a measurement operation on the viewer.

Therefore, an object of the present invention is to provide a video and audio output system capable of localizing a sound image at a height of a television display so that a sound having great reality can be easily enjoyed due to a video image and a localized sound image appearing at the same height.

The present invention is directed to a video and audio output system comprising an audio output device and a video and audio output device placed above the audio output device, for outputting an acoustic signal so as to localize a sound image of the acoustic signal at a predetermined position. In one aspect of the video and audio output system for achieving the above-mentioned object, the audio output device comprises: an acoustic signal output control section for extracting, from the acoustic signal, a low-frequency-component acoustic signal and a high-frequency-component acoustic signal; a first sound image localization processing filter section for performing a sound image localization process on the low-frequency-component acoustic signal; a plurality of first loudspeakers for outputting a plurality of low-frequency-component acoustic signals which are outputted from the first sound image localization processing filter section; a second sound image localization processing filter section for performing a sound image localization process on the high-frequency-component acoustic signal; and a first communication section for transmitting, to the video and audio output device, a plurality of high-frequency-component acoustic signals which are outputted from the second sound image localization processing filter section. The video and audio output device comprises: a second communication section for receiving the plurality of high-frequency-component acoustic signals which are transmitted from the audio output device; a plurality of second loudspeakers for outputting the plurality of high-frequency-component acoustic signals; and a video display section for displaying a video signal thereon. In this case, preferably, the low-frequency-component acoustic signal at least includes a frequency component of 1 kHz or lower, and the high-frequency-component acoustic signal at least includes a frequency component of 4 kHz or higher.

In another aspect of the video and audio output system for achieving the above-mentioned object, the audio output device may comprise: a first sound image localization processing filter section for performing a sound image localization process on the acoustic signal; a plurality of acoustic signal output control sections corresponding to a plurality of acoustic signals outputted by the first sound image localization processing filter section, the acoustic signal output control sections extracting, from the acoustic signals, low-frequency-component acoustic signals and high-frequency-component acoustic signals; a plurality of first loudspeakers for outputting a plurality of the low-frequency-component acoustic signals which are extracted by the plurality of acoustic signal output control sections, respectively; and a first communication section for transmitting, to the video and audio output device, a plurality of the high-frequency-component acoustic signals which are extracted by the plurality of acoustic signal output control sections, respectively.

Typically, the acoustic signal output control section includes: a low-pass filter for allowing only the low-frequency-component acoustic signal among the acoustic signals to pass therethrough; and a high-pass filter for allowing only the high-frequency-component acoustic signal among the acoustic signals to pass therethrough.

The audio output device may further comprise a judging section for judging a kind of the video and audio output device based on information obtained from the video and audio output device, and the acoustic signal output control section may control a level of the acoustic signal having passed through the low-pass filter and a level of the acoustic signal having passed through the high-pass filter, based on a result of judgment of the judging section. In this case, the first sound image localization processing filter section may control the sound image localization process, based on the result of judgment of the judging section.

The audio output device may further comprise a view mode input section for inputting a view mode reflecting a viewer's preference, and the acoustic signal output control section may control a cutoff frequency of the low-pass filter, a level of the acoustic signal having passed through the low-pass filter, a cutoff frequency of the high-pass filter, and a level of the acoustic signal having passed through the high-pass filter, based on the view mode inputted to the view mode input section.

The audio output device may further comprise a volume setting input section for inputting a volume value set by a viewer, and control a level of the low-frequency-component acoustic signal, which is to be inputted to each of the first loudspeakers, based on the volume value inputted to the volume setting input section. In this case, the video and audio output device may obtain, from the audio output device, the volume value inputted to the volume setting input section, and control a level of the high-frequency-component acoustic signal, which is to be inputted to each of the second loudspeakers, based on the volume value inputted to the volume setting input section.

Further, it is conceivable that: the audio output device further comprises: a process assignment determination section for determining assignment between the amount of sound image localization process to be performed by the audio output device and the amount of sound image localization process to be performed by the video and audio output device, based on a signal processing capacity allocatable to signal processing for sound image localization, which is obtained from the video and audio output device; and a first processing amount control section for controlling the sound image localization process performed by the first sound image localization processing filter section, in accordance with the assignment determined by the process assignment determination section; and the video and audio output device further comprises: a third sound image localization processing filter section for performing the sound image localization process on the high-frequency-component acoustic signal received by the second communication section, and outputting the signal to each of the plurality of second loudspeakers; and a second processing amount control section for controlling the sound image localization process performed by the third sound image localization processing filter section, in accordance with the assignment determined by the process assignment determination section which is provided by the audio output device.

With a video and audio output system according to the present invention, a sound having great reality, due to a video image and a localized sound image appearing at the same height, can be easily enjoyed.

BRIEF DESCRIPTION OF THE DRAWINGS

FIG. 3 is a diagram showing a detailed configuration of an acoustic signal output control section 12a.

FIG. 7 is a diagram showing a detailed configuration of a processing coefficient setting section 17a.

FIG. 13 is a diagram showing a detailed configuration of a processing coefficient setting section 17b and a sound image localization processing filter section 75a.

FIG. 19 is a diagram showing a configuration of a sound image localization processing filter section for low-frequency components for all channels.

DESCRIPTION OF THE REFERENCE CHARACTERS

| | |
|---|---|
| 4, 4a, 4b, 104 | viewer |
| 10 | AV rack loudspeaker apparatus |
| 11a, 11b, 21a, 21b, 102a-102f | loudspeaker |
| 12a-12d | acoustic signal output control section |
| 13a-13f, 75a | sound image localization processing filter section |
| 14a, 27a | television sound image localization processing filter section |
| 15, 22 | HDMI communication section |
| 16 | television judging section |
| 17a, 17b | processing coefficient setting section |
| 20 | television |
| 23, 105 | display |
| 24 | broadcast-wave receiving section |
| 24c, 84a | gain setting section |
| 25 | processing capacity detection section |
| 26, 75 | processing amount control section |
| 27, 73 | acoustic signal communication section |
| 30a, 30b, 31b, 32b, 103a, 103b | sound image |
| 33a, 33b, 42a, 42b, 43a-43h, 51a, 51b, 76a, 76b, 101a, 101b | FIR filter |
| 41a, 41b | adaptive filter |
| 44a-44d, 111a, 111b | adder |
| 45a, 45b | filter coefficient update section |
| 61a, 61b | processing coefficient reference section |
| 62 | processing coefficient database |
| 71 | volume setting input section |
| 72 | view mode setting input section |
| 74 | process assignment determination section |
| 77b | processing coefficient synthesis section |
| 81 | low-pass section |
| 82 | high-pass section |
| 83a-83f | variable multiplier unit |
| 106 | processing circuit |
| 107 | equalizer |
| 108 | band-pass filter |

110a-110d amplifier

DETAILED DESCRIPTION OF THE INVENTION

Figure 1:
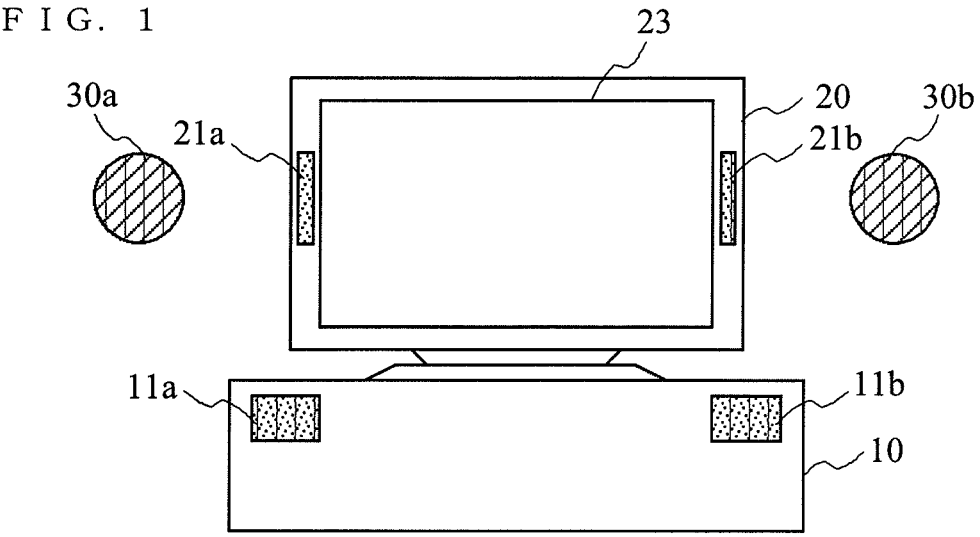
FIG. 1 is a diagram showing an exemplary basic configuration of a video and audio output system of the present invention.

FIG. 1 is a diagram showing an exemplary basic configuration of a video and audio output system of the present invention. The video and audio output system includes an AV rack loudspeaker apparatus 10 that is an audio output device to which a video signal and an acoustic signal are inputted from the outside, and a television 20 that is a video and audio output device placed on the AV rack loudspeaker apparatus 10 and connected to the AV rack loudspeaker apparatus 10 via an HDMI (High-Definition Multimedia Interface) cable.

The HDMI is a standard for multiplexing a plurality of signals such as a video signal, a multi-channel acoustic signal, a CEC (Consumer Electronics Control) signal for controlling an operation of an apparatus, an EDID (Extended Display Identification Data) signal for authenticating an apparatus, and the like, and transmitting the signals thus multiplexed via a single cable. Using the HDMI makes it possible to simply connect a plurality of apparatuses via a single cable.

The AV rack loudspeaker apparatus 10 is equipped with at least two loudspeakers. The AV rack loudspeaker apparatus 10 shown in FIG. 1 is equipped with a loudspeaker 11a on the left side from its center and a loudspeaker 11b on the right side from its center. The AV rack loudspeaker apparatus 10 is characterized by being capable of an audio output with high sound quality, that is, with constant amplitude-frequency characteristics over a wide frequency band including low frequencies, because the AV rack loudspeaker apparatus 10 has an enough space to mount a loudspeaker and therefore a relatively large loudspeaker is mounted therein.

On the other hand, the television 20 is also equipped with at least two loudspeakers. The television 20 shown in FIG. 1 is equipped with a loudspeaker 21a at the left side of a display 23 which is a video display section, and a loudspeaker 21b at the right side of the display 23. In the television 20, an audio output in a low-frequency band is deficient, because the television 20 has no enough space around the display 23 to mount a loudspeaker and therefore merely a small loudspeaker is mounted therein. The present invention is not limited to the structure shown in FIG. 1, but applicable also to a television having a loudspeaker disposed on the upper or lower side of the display 23.

The video and audio output system of the present invention, which outputs a multi-channel acoustic signal as audio having high sound quality and localizes a sound image at a predetermined position, can be realized with simple wiring. FIG. 1 shows a sound image 30a that is localized based on an L-channel acoustic signal and a sound image 30b that is localized based on an R-channel acoustic signal, which are realized by the video and audio output system of the present invention. It is shown that the sound images are set at positions outside the AV rack loudspeaker apparatus 10 and the television 20 and at the height of the display 23 of the television 20.

In the following, specific embodiments of the video and audio output system according to the present invention will be sequentially described. In the descriptions of the respective embodiments, an inputted acoustic signal is an R-channel signal. However, an inputted acoustic signal includes a plurality of channel signals (L, R, C, and the like), and of course each signal is subjected to a process described below.

FIRST EMBODIMENT

Figure 2:
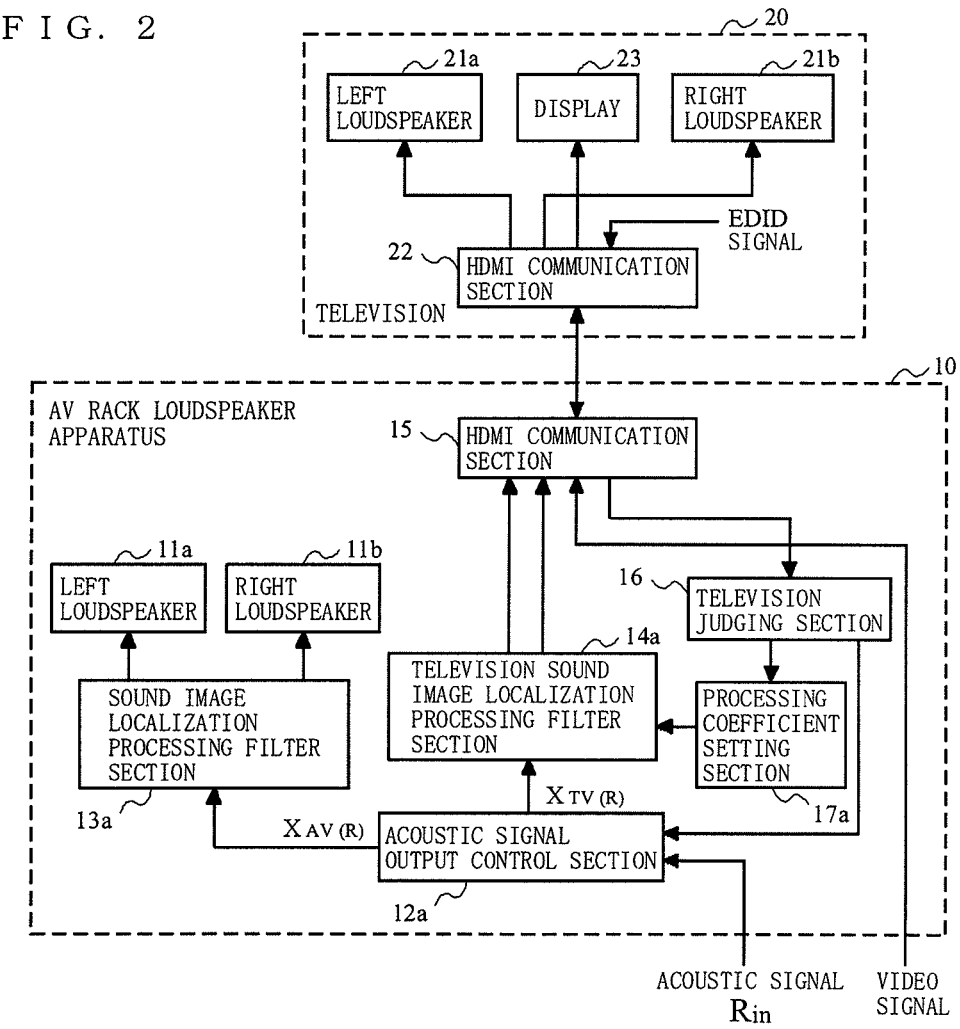
FIG. 2 is a diagram showing a detailed configuration of a video and audio output system according to a first embodiment of the present invention.

FIG. 2 is a diagram showing a detailed configuration of a video and audio output system according to a first embodiment of the present invention. An AV rack loudspeaker apparatus 10 according to the first embodiment includes loudspeakers 11a and 11b, an acoustic signal output control section 12a, a sound image localization processing filter section 13a, a television sound image localization processing filter section 14a, an HDMI communication section 15, a television judging section 16, and a processing coefficient setting section 17a. A television 20 includes loudspeakers 21a and 21b, an HDMI communication section 22, and a display 23.

First, respective components of the AV rack loudspeaker apparatus 10 will be described.

The acoustic signal output control section 12a, to which an R-channel acoustic signal $R_{in}$ is inputted from the outside, divides the R-channel acoustic signal $R_{in}$ into an acoustic signal $X_{AV(R)}$ and an acoustic signal $X_{TV(R)}$, based on a judgment result outputted from the television judging section 16 which will be described later. The acoustic signal $X_{AV(R)}$ is outputted as audio from the AV rack loudspeaker apparatus 10. The acoustic signal $X_{TV(R)}$ is outputted as audio from the television 20.

Figure 3:
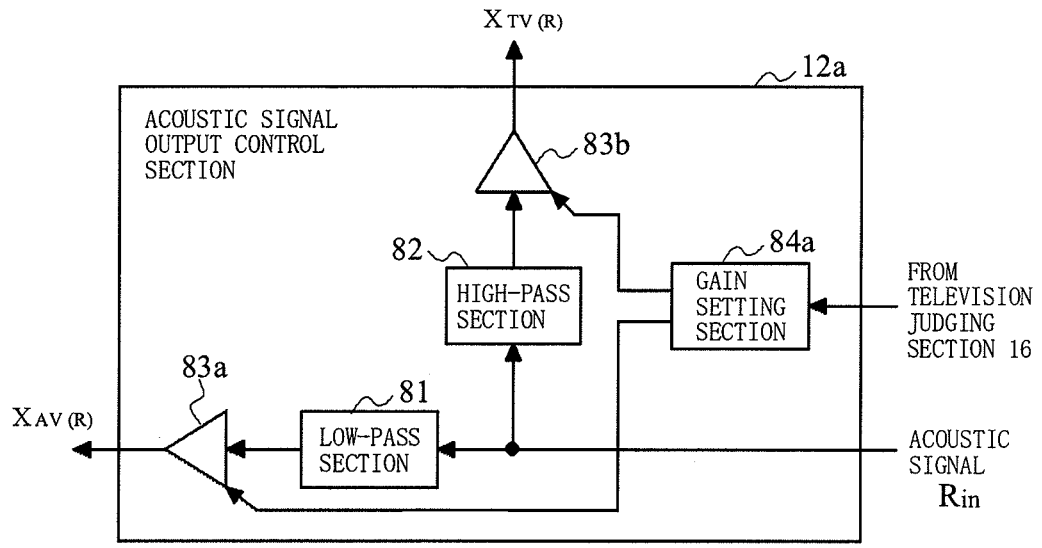

FIG. 3 is a diagram showing a detailed configuration of an acoustic signal output control section 12a. The acoustic signal $R_{in}$ is inputted to a low-pass section 81 and a high-pass section 82. The low-pass section 81, which is for example a low-pass filter with a predetermined cutoff frequency, extracts a low-frequency component of the acoustic signal $R_{in}$. The high-pass section 82, which is for example a high-pass filter with a predetermined cutoff frequency, extracts a high-frequency component of the acoustic signal $R_{in}$. A variable multiplier unit 83a multiplies an output signal from the low-pass section 81 by a gain provided by a gain setting section 84a, and outputs a multiplication result as the acoustic signal $X_{AV(R)}$. A variable multiplier unit 83b multiplies an output signal from the high-pass section 82 by a gain provided by the gain setting section 84a, and outputs a multiplication result as the acoustic signal $X_{TV(R)}$. The gain setting section 84a provides predetermined gains to the variable multiplier units 83a and 83b in accordance with a signal from the television judging section 16. The gain setting section 84a will be detailed later.

Figure 4:
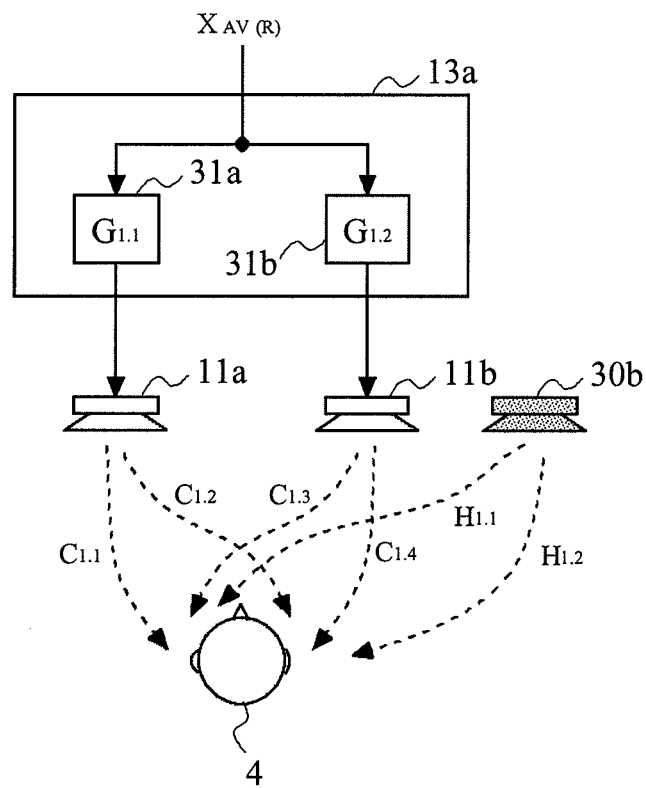
FIG. 4 is a diagram showing a configuration of a sound image localization processing filter section 13a, and HR transfer functions.

Reference is made to FIG. 2 again. The sound image localization processing filter section 13a performs a sound image localization process in such a manner that a sound image is localized at a predetermined position when an acoustic signal $X_{AV(R)}$ is outputted as audio. The sound image localization process performed by the sound image localization processing filter section 13a is as described in the prior art above. When HR transfer functions for transfer from a target sound image 30b to both ears of a viewer 4 are defined as $H_{1,1}$ and $H_{1,2}$, coefficients for FIR filters 33a and 33b included in the sound image localization processing filter section 13a are determined based on HR transfer functions $G_{1,1}$ and $G_{1,2}$ that satisfy FIG. 4 and Equation 2. Acoustic signals obtained by the sound image localization process are outputted to the loudspeakers 11a and 11b, respectively.

$$\begin{bmatrix} C_{1,1} & C_{1,3} \\ C_{1,2} & C_{1,4} \end{bmatrix} \begin{bmatrix} G_{1,1} \\ G_{1,2} \end{bmatrix} = \begin{bmatrix} H_{1,1} \\ H_{1,2} \end{bmatrix} \quad \text{[Equation 2]}$$

Here will be described an approach for approximately determining a coefficient for an FIR filter by using a known adaptive algorithm, instead of determining the coefficient after calculating the above-mentioned HR transfer functions $G_{1,1}$ and $G_{1,2}$.

Figure 5:
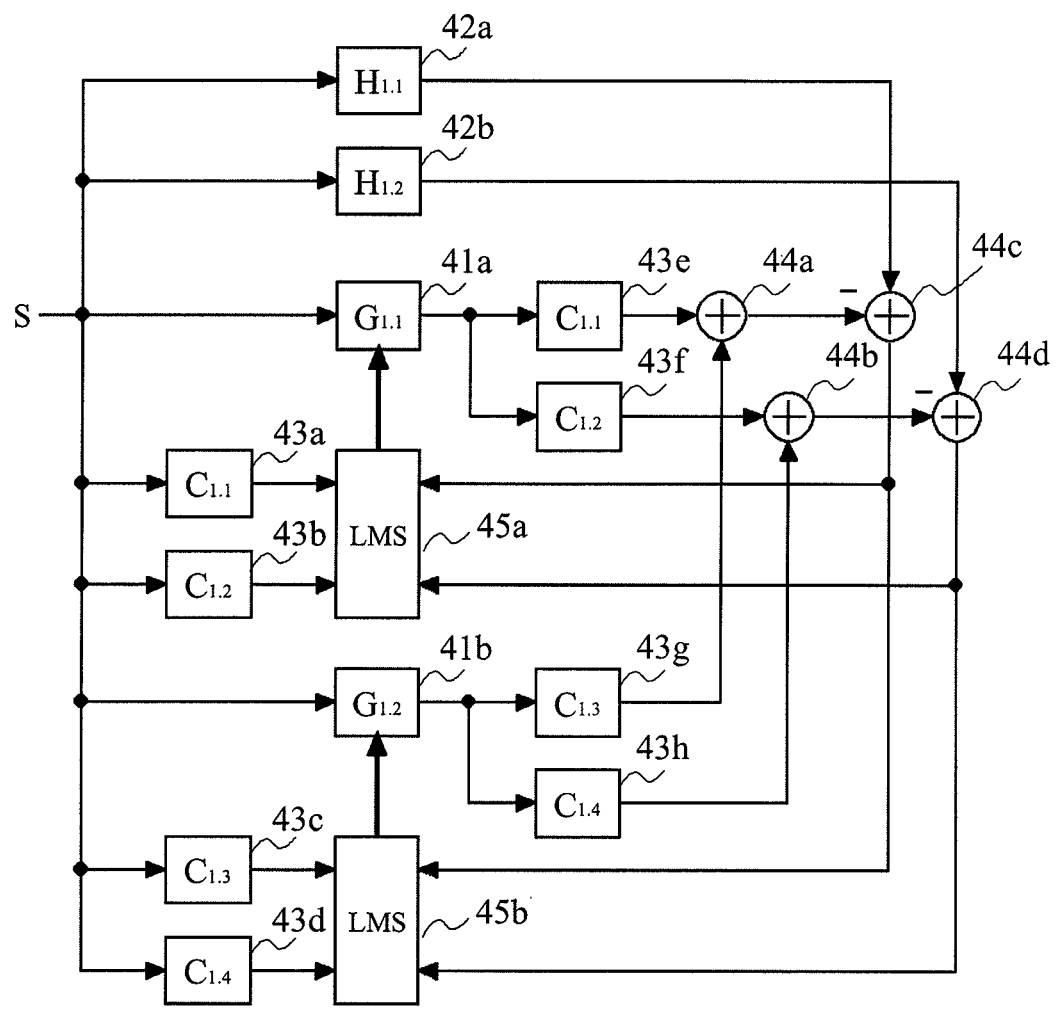
FIG. 5 is a diagram showing an exemplary configuration of a signal processing circuit for determining a coefficient for an FIR filter by using an adaptive algorithm.

FIG. 5 shows an exemplary configuration of a signal processing circuit for determining a coefficient for an FIR filter by using an adaptive algorithm. A design reference signal S is inputted to the signal processing circuit. A broadband signal such as white noise is desirable as the design reference signal S. Adaptive filters 41a and 41b process the design reference signal S. FIR filters 42a, 42b, and 43a-43d have processing characteristics based on HR transfer functions $H_{1,1}$, $H_{1,2}$, and $C_{1,1}$ to $C_{1,4}$, respectively, and process the design reference signal S. FIR filters 43e and 43f have processing characteristics based on HR transfer functions $C_{1,1}$ and $C_{1,2}$, respectively, and process an output signal from the adaptive filter 41a. FIR filters 43g and 43h have processing characteristics based on HR transfer functions $C_{1,3}$ and $C_{1,4}$, respectively, and process an output signal from the adaptive filter 41b.

An adder 44a adds together an output from the FIR filter 43e and an output from the FIR filter 43g. An adder 44b adds together an output from the FIR filter 43f and an output from the FIR filter 43h. An adder 44c subtracts an output from the adder 44a, from an output from the FIR filter 42a. An adder 44d subtracts an output from the adder 44b, from an output from the FIR filter 42b. A filter coefficient update section 45a updates a coefficient for the adaptive filter 41a, based on outputs from the FIR filters 43a and 43b, the adder 44c, and the adder 44d. A filter coefficient update section 45b updates a coefficient for the adaptive filter 41b, based on outputs from the FIR filters 43c and 43d, the adder 44c, and the adder 44d. Updating of filter coefficients by the filter coefficient update sections 45a and 45b is based on a known LMS algorithm, and therefore a detailed description of the operation is omitted here.

In the configuration shown in FIG. 5, when output levels of the adders 44c and 44d, which are adaptive errors, are sufficiently low, coefficients for the adaptive filters 41a and 41b can be obtained as coefficients for the FIR filters 33a and 33b that approximately satisfy Equation 2.

Figure 6:
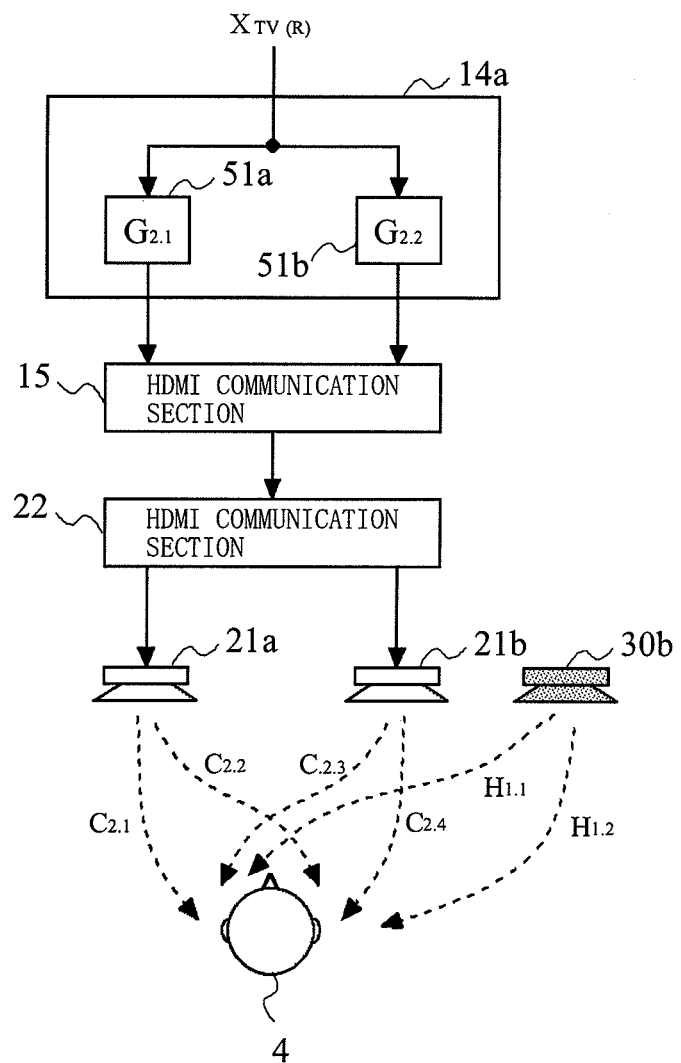
FIG. 6 is a diagram showing a configuration of a television sound image localization processing filter section 14a, and HR transfer functions.

Reference is made to FIG. 2 again. The television sound image localization processing filter section 14a performs a sound image localization process in such a manner that a sound image is localized at a predetermined position when an acoustic signal $X_{TV(R)}$ is outputted as audio. In the sound image localization process performed by the television sound image localization processing filter section 14a, the process described above in relation to the sound image localization processing filter section 13a is performed, in consideration of information specific to the television 20 such as locations of the loudspeakers 21a and 21b, and the like (which will be described later). When head-related acoustic transfer functions for transfer from a target sound image 30b to both ears of the viewer 4 are defined as $H_{1,1}$, and $H_{1,2}$, coefficients for FIR filters 51a and 51b included in the television sound image localization processing filter section 14a are determined based on HR transfer functions $G_{2,1}$ and $G_{2,2}$ that satisfy FIG. 6 and Equation 3. Acoustic signals obtained by the sound image localization process are outputted from the HDMI communication section 15 to the television 20.

$$\begin{bmatrix} C_{2,1} & C_{2,3} \\ C_{2,2} & C_{2,4} \end{bmatrix} \begin{bmatrix} G_{2,1} \\ G_{2,2} \end{bmatrix} = \begin{bmatrix} H_{1,1} \\ H_{1,2} \end{bmatrix} \quad \text{[Equation 3]}$$

The HDMI communication section 15 multiplexes, based on the HDMI standard, a video signal inputted thereto and an acoustic signal outputted from the television sound image localization processing filter section 14a, and outputs a multiple signal to the television 20. In addition, the HDMI communication section 15 outputs an EDID signal inputted from the television 20, to the television judging section 16. The television judging section 16 judges the model number of the television 20 based on the EDID signal. A judgment result is outputted to the acoustic signal output control section 12a and the processing coefficient setting section 17a. Based on the judgment result of the television judging section 16, the processing coefficient setting section 17a changes a processing coefficient for the television sound image localization processing filter section 14a.

Next, respective components of the television 20 will be described.

The HDMI communication section 22, to which a multiple signal is inputted from the HDMI communication section 15 of the AV rack loudspeaker apparatus 10, divides the multiple signal into a video signal and an acoustic signal based on the HDMI standard. In addition, the HDMI communication section 22 outputs an EDID signal including information about the model number of the television 20, to the AV rack loudspeaker apparatus 10. The video signal resulting from the division by the HDMI communication section 22 is outputted to the display 23. The acoustic signal resulting from the division by the HDMI communication section 22 is outputted to the loudspeakers 21a and 21b, respectively.

Next, a method for setting coefficients for the FIR filters 51a and 51b will be described.

As apparent from Equation 3, optimum coefficients for the FIR filters 51a and 51b vary depending on the HR transfer functions $C_{1.1}$ to $C_{1.4}$ of the loudspeakers 21a and 21b. This is because the HR transfer functions $C_{1.1}$ to $C_{1.4}$ vary depending on the acoustic transfer functions of the loudspeakers 21a and 21b, the installation state of the loudspeakers 21a and 21b in a television cabinet, a difference in the angle of opening of the loudspeakers 21a and 21b when seen from the viewer 4, and the like, that is, depending on the kind of the television 20. In addition, the audio output efficiency of the loudspeakers 21a and 21b also varies depending on the kind of the television 20. Therefore, a balance between an audio output level of the AV rack loudspeaker apparatus 10 and an audio output level of the television 20 also varies depending on the kind of the television 20.

The television judging section 16 and the processing coefficient setting section 17a are components for solving the above-described problem, and perform processes of optimally setting coefficients for the FIR filters 51a and 51b and gains for the variable multiplier units 83a and 83b in accordance with the kind of the television 20.

Figure 7:
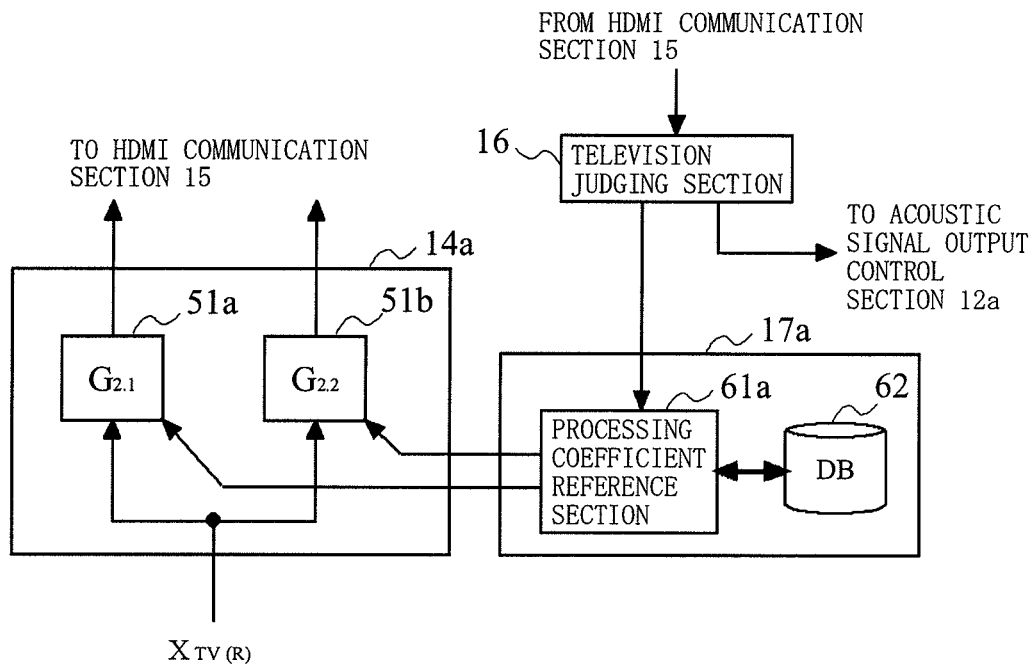

FIG. 7 shows a detailed configuration of the processing coefficient setting section 17a. The television judging section 16 receives the EDID signal from the television 20 via the HDMI communication section 15. Normally, the EDID signal is defined as the standard for transmitting and receiving information about display specifications, but the HDMI communication section 22 transmits the EDID signal with information about the kind (the model number) of the television 20 being included therein. The television judging section 16 identifies the model number of the television 20 based on the received EDID signal, and outputs an identification signal to the processing coefficient setting section 17a and the acoustic signal output control section 12a.

The processing coefficient setting section 17a includes a processing coefficient reference section 61a to which the identification signal is inputted, and a processing coefficient database 62. In the processing coefficient database 62, coefficients for the FIR filters 51a and 51b are held in advance. The coefficients for the FIR filters 51a and 51b are pre-designed in accordance with model numbers, manufacturers, and the like, of the television 20. The processing coefficient reference section 61a reads out optimum coefficients from the processing coefficient database 62 based on the identification signal of the television 20, and sets the optimum coefficients to the FIR filters 51a and 51b. When the optimum coefficient corresponding to the television 20 is not held in the processing coefficient database 62, the processing coefficient reference section 61a may, for example, set an average value of all the held coefficients, set the coefficient "1" to one FIR filter and the coefficient "0" to the other FIR filter so as to localize a sound image at a position of one of the loudspeakers, or set the coefficient "0" to both of the FIR filters so as to make no audio output from the loudspeakers 21a and 21b.

Next, setting of gains for the variable multiplier units 83a and 83b shown in FIG. 3 will be described.

Figure 8:
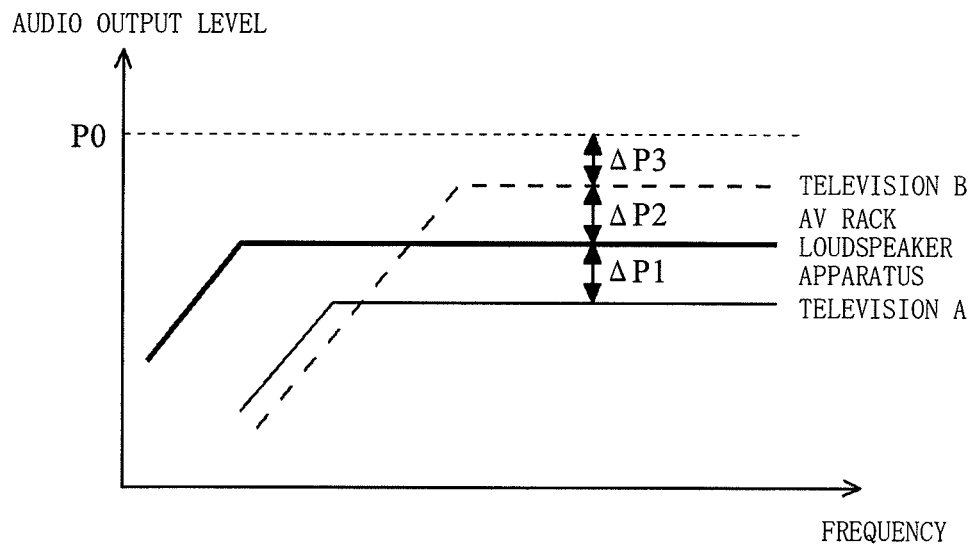
FIG. 8 is a diagram showing audio output levels of an AV rack loudspeaker apparatus 10 and a television 20.

FIG. 8 is a diagram showing, in an image, audio output levels being compared between when an acoustic signal is inputted to the loudspeakers 11a and 11b of the AV rack loudspeaker apparatus 10 and when an acoustic signal of the same level is inputted to the loudspeakers 21a and 21b of the television 20. The gain setting section 84a corrects a difference in the audio output level between the AV rack loudspeaker apparatus 10 and the television 20 as shown in FIG. 8, and moreover adjusts gains for the variable multiplier units 83a and 83b so as to obtain a desired audio output level.

For example, suppose a case where an audio output level of the AV rack loudspeaker apparatus 10 is the same as an audio output level of the television 20 and the audio output level corresponding to volume setting made by the viewer 4 is P0. When the television 20 is the television A, the gain setting section 84a shown in FIG. 3 provides the variable multiplier unit 83a with a gain for raising the audio output level by "ΔP2+ΔP3" and provides the variable multiplier unit 83b with a gain for raising the audio output level by "ΔP1+ΔP2+ΔP3". When the television 20 is the television B, the gain setting section 84a provides the variable multiplier unit 83a with a gain for raising the audio output level by "ΔP2+ΔP3" and provides the variable multiplier unit 83b with a gain for raising the audio output level by "ΔP3".

Figure 9:
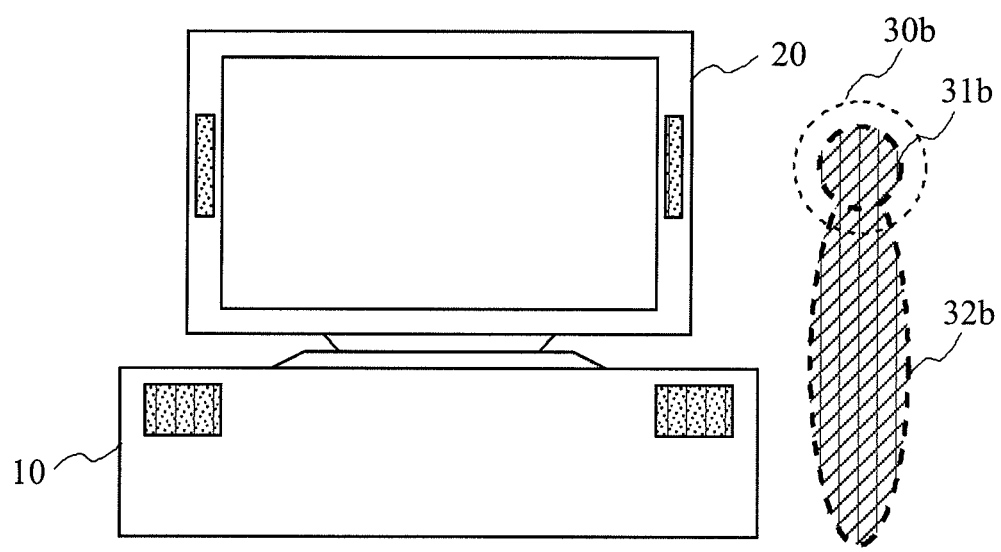
FIG. 9 is a diagram showing sound images corresponding to different frequency bands in the video and audio output system according to the first embodiment.

FIG. 9 shows positions of sound images corresponding to different frequency bands recognized by the viewer 4, in the video and audio output system according to the first embodiment.

In acoustic signals outputted from the loudspeakers 11a and 11b of the AV rack loudspeaker apparatus 10, a high-frequency component is sufficiently attenuated due to the process by the low-pass section 81. Therefore, the high-frequency component, which is a clue for recognizing a sound image height, is not outputted as audio from the loudspeakers 11a and 11b, and only the low-frequency component is outputted as audio therefrom. As a result, a sound image localized based on the audio output from the loudspeakers 11a and 11b is a sound image 32b whose localization position in the height direction is ambiguous. However, since the loudspeakers 11a and 11b are capable of an audio output with constant amplitude-frequency characteristics over a wide frequency band including low frequencies, the viewer 4 can hear high-quality sounds.

On the other hand, in acoustic signals outputted from the loudspeakers 21a and 21b of the television 20, the low-frequency component is sufficiently attenuated due to the process by the high-pass section 82. Therefore, the low-frequency component is not outputted as audio from the loudspeakers 21a and 21b, and only the high-frequency component, which is a clue for recognizing a sound image height, is outputted as audio therefrom. As a result, a sound image localized based on the audio output from the loudspeakers 21a and 21b which are located substantially at the same height as that of the display 23 is positioned at a sound image 31b which is located at the height of the display 23, regardless of a control error in the sound image localization process. In addition, since only the high-frequency component is outputted as audio from the loudspeakers 21a and 21b, even though the loudspeakers 21a and 21b are inexpensive loudspeakers which has difficulty in outputting a low-frequency component as audio, the high-frequency component can be outputted as audio with sufficiently high sound quality.

The viewer 4 hears these two kinds of sounds, and can recognize the sound image 30b as a whole. A cutoff frequency of each of the low-pass section 81 and the high-pass section 82 is a frequency that defines a boundary between a flat shape region and a non-flat region in the shape of the amplitude-frequency characteristics of the HR transfer function. To be more specific, each cutoff frequency is desirably within a range of 1 to 4 kHz. This means that a low-frequency-component acoustic signal at least includes a frequency component of 1 kHz or lower and a high-frequency-component acoustic signal at least includes a frequency component of 4 kHz or higher. The cutoff frequency of the low-pass section 81 and the cutoff frequency of the high-pass section 82 may be identical or may overlap each other. When they overlap each other, a resulting sound image is enlarged and blurred, but an obtained sound has enhanced powerfulness.

As described above, in the video and audio output system according to the first embodiment of the present invention, the AV rack loudspeaker apparatus 10 equipped with the high-sound-quality loudspeakers outputs a low-frequency component as audio and the television 20 equipped with the inexpensive loudspeakers outputs a high-frequency component as audio, so that a sound image can be localized at the predetermined position, that is, at the height of the display 23 of the television 20. This enables a viewer to easily enjoy a sound having high sound quality and great reality due to a video image and a localized sound image appearing at the same height, without using an extra connection cable.

In the above description of the first embodiment, the sound image localization process is performed at the loudspeakers 21a and 21b of the television 20, for each of the L-channel signal, the R-channel signal, and the C-channel signal. However, according to the HDMI standard (version 1.3), voice signal data (PCM) for eight channels at the maximum can be multiplexed. Therefore, for example, only high-frequency components of a part of channel signals may be outputted as audio from the television 20 and full-band components of the rest of the channel signals may be outputted as audio from the AV rack loudspeaker apparatus 10.

In the above-described first embodiment, two loudspeakers are mounted on each of the AV rack loudspeaker apparatus 10 and the television 20, but three or more loudspeakers may be mounted thereon. For example, when the number of loudspeakers mounted on the AV rack loudspeaker apparatus 10 is N (N≧3), N FIR filters may be provided in the sound image localization processing filter section 13a, and transfer functions $G_{1,1}$ to $G_{1,N}$ that satisfy Equation 4 may be provided as coefficients for the respective FIR filters.

$$\begin{bmatrix} C_{1,1} & C_{1,3} & \cdots & C_{1,2N-1} \\ C_{1,2} & C_{1,4} & \cdots & C_{1,2N} \end{bmatrix} \begin{bmatrix} G_{1,1} \\ G_{1,2} \\ \vdots \\ G_{1,N} \end{bmatrix} = \begin{bmatrix} H_{11} \\ H_{12} \end{bmatrix}$$ [Equation 4]

In the above-described first embodiment, processing coefficients for the FIR filters, which are processed in the sound image localization processing filter section 13a and the television sound image localization processing filter section 14a, are designed so as to satisfy Equations 2 and 3, respectively. In other words, an acoustic transfer function corresponding to one location is controlled by the two loudspeakers of the AV rack loudspeaker apparatus 10, and an acoustic transfer function corresponding to another location is controlled by the two loudspeakers of the television 20. However, these four loudspeakers in total may be used to control acoustic transfer functions corresponding to two or more locations.

Figure 10:
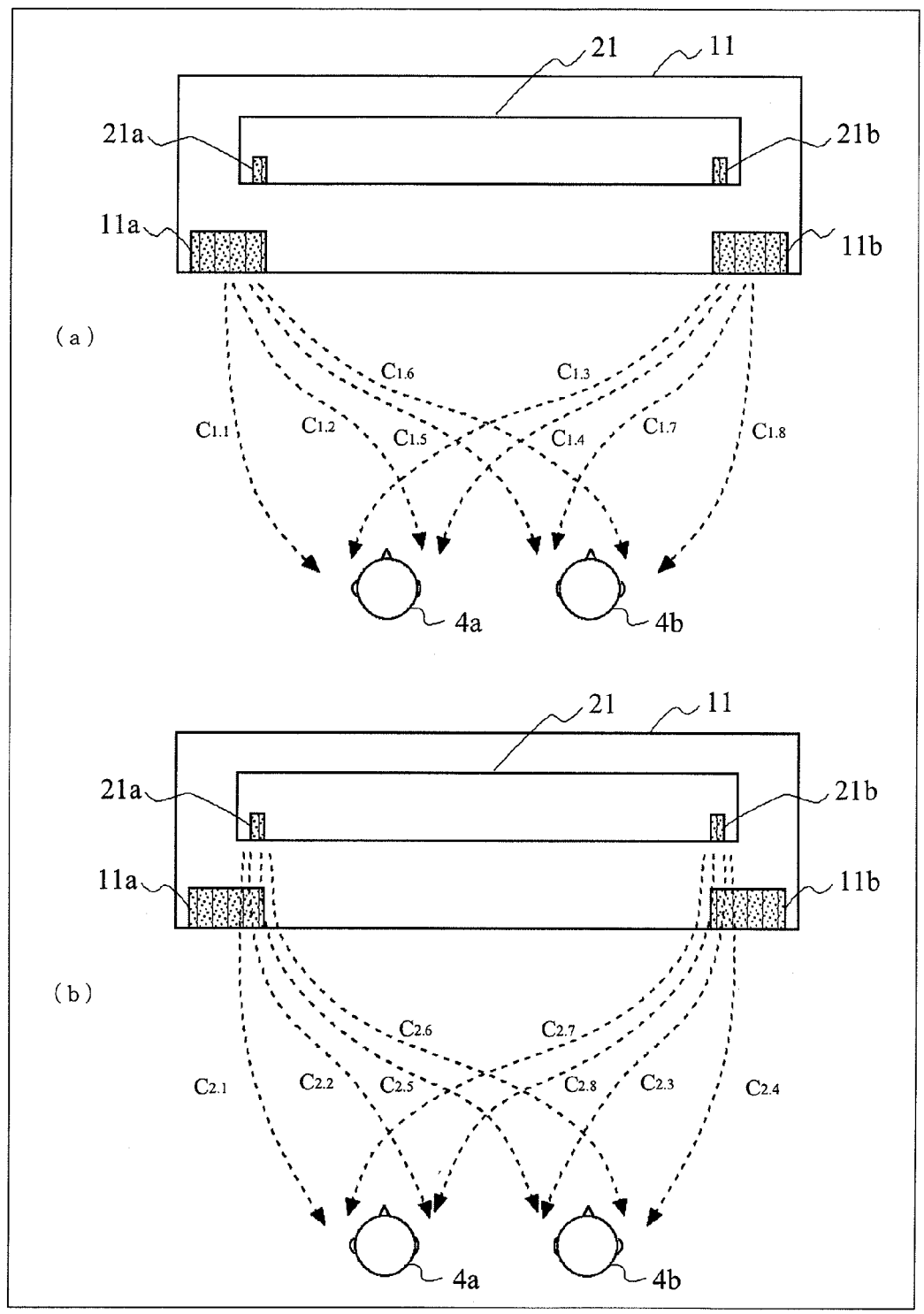
FIG. 10 shows diagrams illustrating HR transfer functions for two viewers receiving a sound image localization effect.

For example, it is conceivable to control acoustic transfer functions corresponding to both ears of two viewers by using four loudspeakers. FIG. 10 is top views showing a positional relationship between the video and audio output system and two adjacent viewers 4a and 4b for which the sound image localization control is performed. The view (a) of FIG. 10 shows HR transfer functions $C_{1,1}$ to $C_{1,8}$ corresponding to paths from the loudspeakers 11a and 11b to both ears of the viewers 4a and 4b. The view (b) of FIG. 10 shows HR transfer functions $C_{2,1}$ to $C_{2,8}$ corresponding to paths from the loudspeakers 21a and 21b to both ears of the viewers 4a and 4b. By setting, as coefficients for the FIR filters, transfer functions $G_{1,1}$ to $G_{2,2}$ that satisfy Equation 5 to the sound image localization processing filter section 13a and the television sound image localization processing filter section 14a, the viewers 4a and 4b can obtain an identical sound image localization effect.

$$\begin{bmatrix} C_{1,1} & C_{1,3} & C_{2,1} & C_{2,3} \\ C_{1,2} & C_{1,4} & C_{2,2} & C_{2,4} \\ C_{1,5} & C_{1,7} & C_{2,5} & C_{2,7} \\ C_{1,6} & C_{1,8} & C_{2,6} & C_{2,8} \end{bmatrix} \begin{bmatrix} G_{1,1} \\ G_{1,2} \\ G_{2,1} \\ G_{2,2} \end{bmatrix} = \begin{bmatrix} H_{1,1} \\ H_{1,2} \\ H_{1,1} \\ H_{1,2} \end{bmatrix}$$ [Equation 5]

Figure 11:
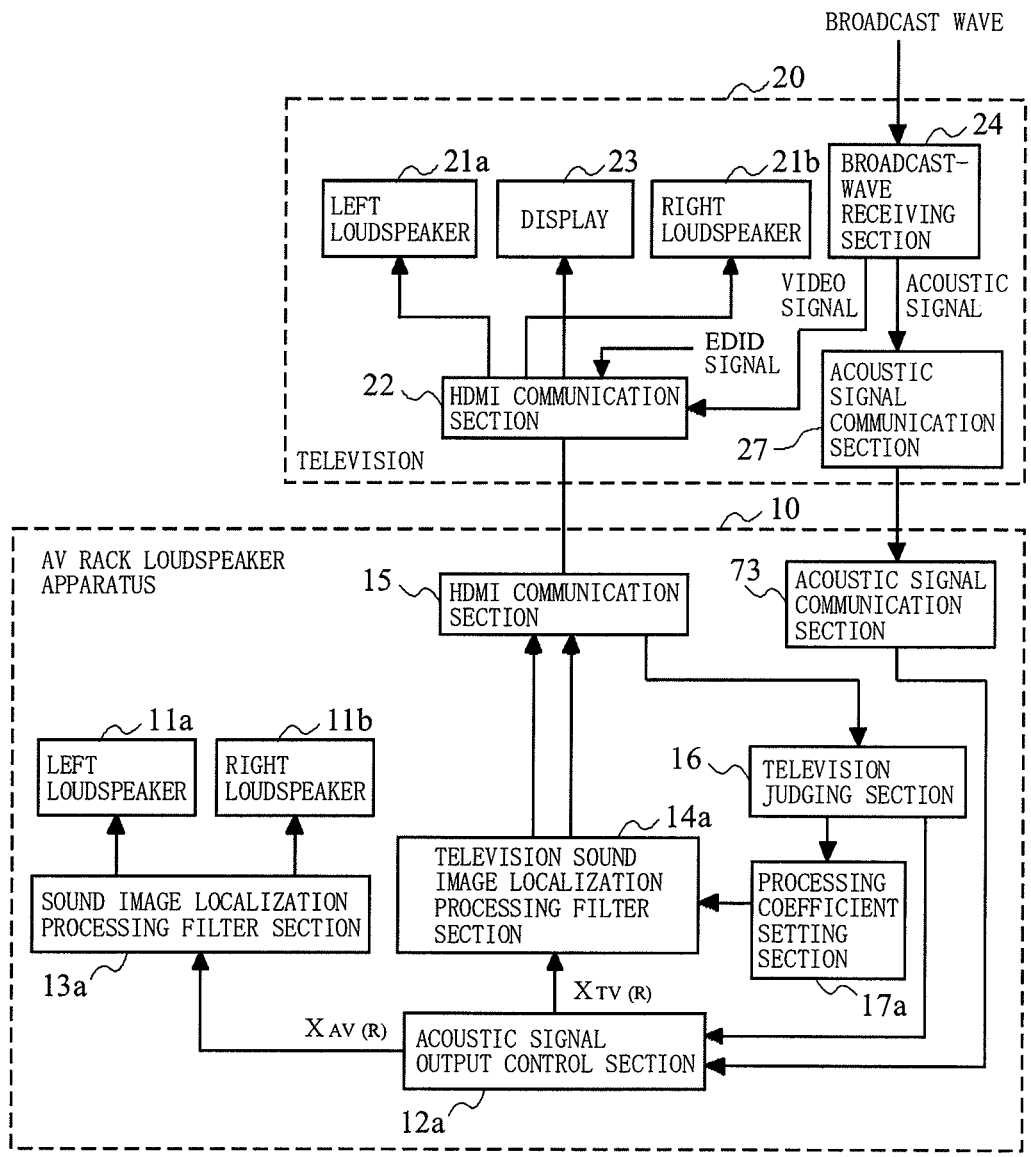
FIG. 11 is a diagram showing a modification of the detailed configuration of the video and audio output system according to the first embodiment of the present invention.

In the above-described first embodiment, an acoustic signal is inputted to the AV rack loudspeaker apparatus 10. However, an acoustic signal obtained from a broadcast wave inputted to the television 20 may be transmitted to the AV rack loudspeaker apparatus 10 as shown in FIG. 11. Referring to FIG. 11, a broadcast-wave receiving section 24 divides a received broadcast wave into a video signal and an acoustic signal. An acoustic signal communication section 27 transmits the acoustic signal resulting from the division to an acoustic signal communication section 73 of the AV rack loudspeaker apparatus 10. The acoustic signal communication section 73 receives the acoustic signal from the television 20, and outputs the acoustic signal to an acoustic signal output control section 12a.

SECOND EMBODIMENT

Figure 12:
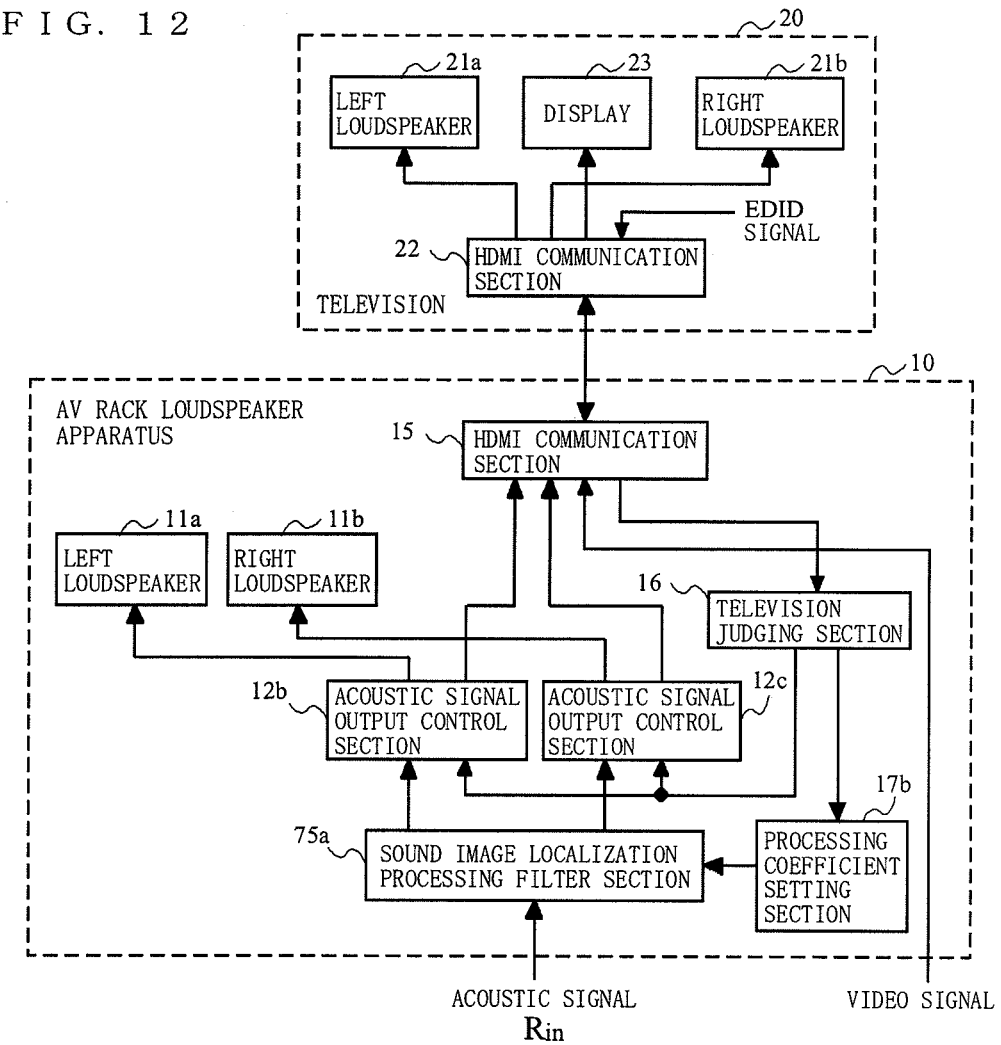
FIG. 12 is a diagram showing a detailed configuration of a video and audio output system according to a second embodiment of the present invention.

FIG. 12 is a diagram showing a detailed configuration of a video and audio output system according to a second embodiment of the present invention. An AV rack loudspeaker apparatus 10 according to the second embodiment includes loudspeakers 11a and 11b, acoustic signal output control sections 12b and 12c, a sound image localization processing filter section 75a, an HDMI communication section 15, a television judging section 16, and a processing coefficient setting section 17b. A television 20 includes loudspeakers 21a and 21b, an HDMI communication section 22, and a display 23.

Figure 13:
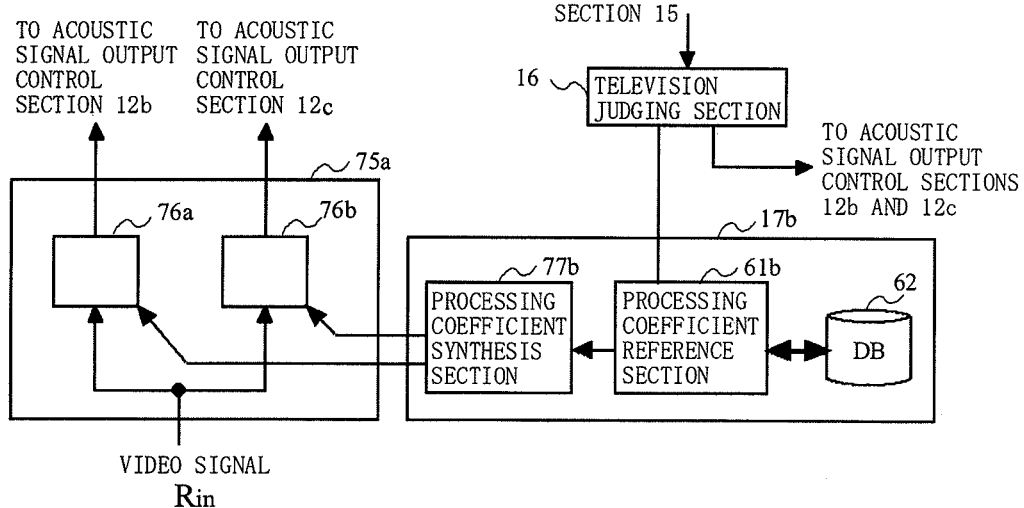

The AV rack loudspeaker apparatus 10 according to the second embodiment is different from the AV rack loudspeaker apparatus 10 according to the first embodiment described above, in terms of the acoustic signal output control sections 12b and 12c, the sound image localization processing filter section 75a, and the processing coefficient setting section 17b. In the following, the second embodiment will be described focusing mainly on the different points. FIG. 13 is a diagram showing a detailed configuration of the processing coefficient setting section 17b and the sound image localization processing filter section 75a.

The sound image localization processing filter section 75a includes an FIR filter 76a for the left loudspeaker and an FIR filter 76b for the right loudspeaker, and performs a sound image localization process on an inputted acoustic signal. The processing coefficient setting section 17b includes a processing coefficient reference section 61b to which an identification signal is inputted, a processing coefficient database 62, and a processing coefficient synthesis section 77b. Based on the identification signal inputted from the television judging section 16, the processing coefficient reference section 61b reads out, from the processing coefficient database 62, an optimum coefficient for generating a high-frequency component to be outputted as audio from the television 20. In the processing coefficient synthesis section 77b, processing coefficients for generating a low-frequency component to be outputted as audio from the AV rack loudspeaker apparatus 10 are held in advance. The processing coefficient synthesis section 77b synthesizes the processing coefficient held therein with the processing coefficient read out by the processing coefficient reference section 61b. Then, the processing coefficient synthesis section 77b sets the synthesized processing coefficient to the FIR filters 76a and 76b.

Figure 14:
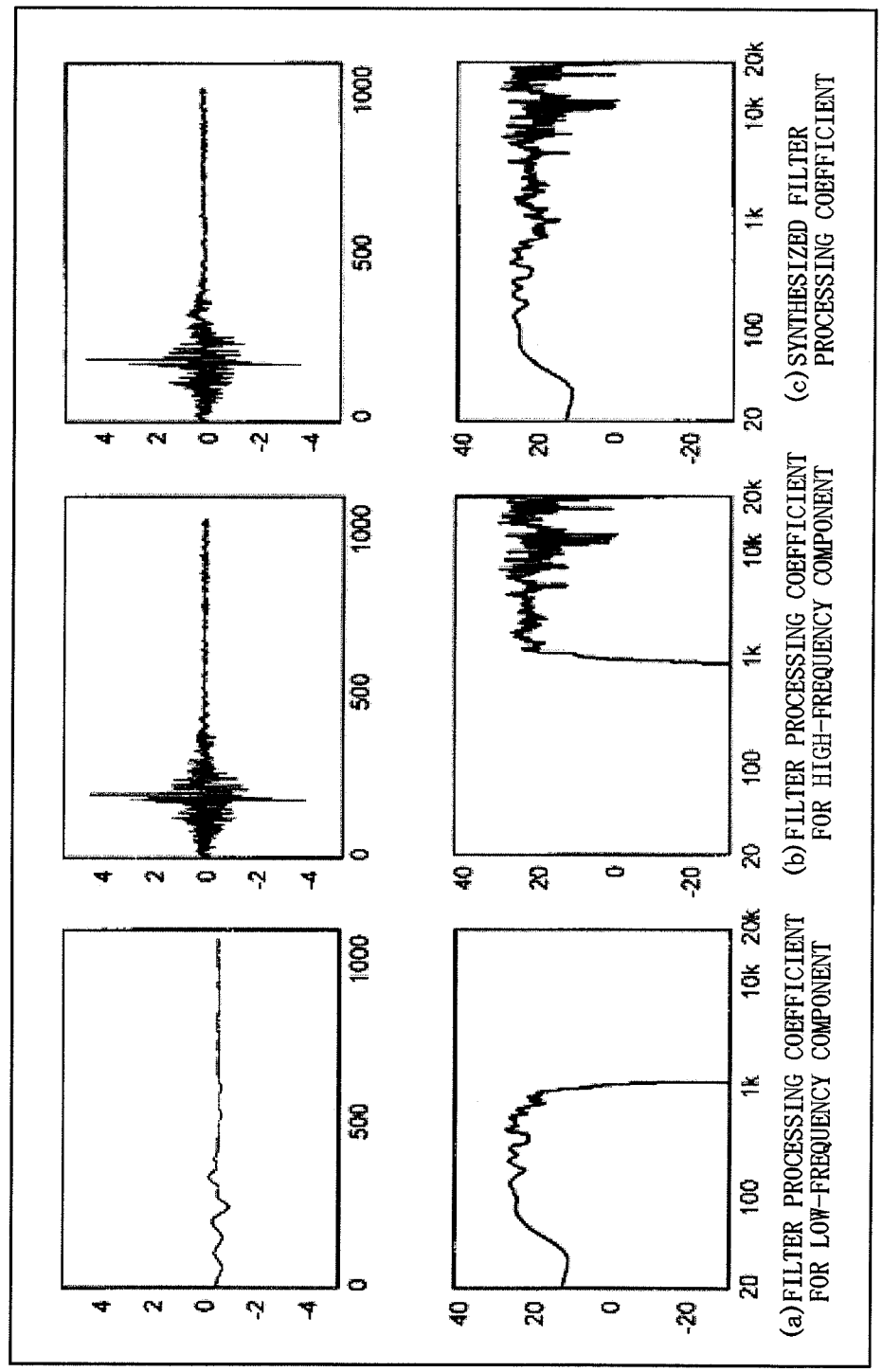
FIG. 14 is graphs showing exemplary processing coefficients in the case of dividing the frequency after a sound image localization process.

FIG. 14 shows exemplary processing coefficients that are set to the FIR filter 76a, in the case where a frequency forming a boundary between a component that is outputted as audio from the AV rack loudspeaker apparatus 10 and a component that is outputted as audio from the television 20 is 1 kHz. In FIG. 14, upper graphs show coefficient values, and lower graphs show amplitude-frequency characteristics. In FIG. 14, (a) shows a filter processing coefficient $G_{1,1}$ for generating a low-frequency component, which is held in the processing coefficient synthesis section 77b in advance. In FIG. 14, (b) shows a filter processing coefficient $G_{2,1}$ for generating a high-frequency component, which is read out by the processing coefficient reference section 61b. In FIG. 14, (c) shows a processing coefficient $G_1$ obtained by synthesizing the filter processing coefficient $G_{1,1}$ and the filter processing coefficient $G_{2,1}$ based on Equation 6.

$$G_1 = G_{1,1} + G_{2,1} = \lfloor g_{1,1}(1) g_{1,1}(2) \ldots g_{1,1}(N) \rfloor + \lfloor g_{2,1}(1) g_{2,1}(2) \ldots g_{2,1}(N) \rfloor \quad \text{[Equation 6]}$$

The processing coefficient synthesis section 77b sets a processing coefficient $G_1$ for the left loudspeaker and a processing coefficient $G_1$ for the right loudspeaker to the FIR filters 76a and 76b, respectively. Outputs from the FIR filters 76a and 76b are, via the acoustic signal output control sections 12b and 12c, divided into a low-frequency-component acoustic signal $X_{AV(R)}$ which is outputted as audio from the AV rack loudspeaker apparatus 10, and a high-frequency-component acoustic signal $X_{TV(R)}$ which is outputted as audio from the television 20. The configurations of the acoustic signal output control sections 12b and 12c are the same as that of the acoustic signal output control section 12a shown in FIG. 3.

As described above, in the video and audio output system according to the second embodiment of the present invention, the AV rack loudspeaker apparatus 10 equipped with the high-sound-quality loudspeakers outputs a low-frequency component as audio and the television 20 equipped with the inexpensive loudspeakers outputs a high-frequency component as audio, so that a sound image can be localized at the predetermined position, that is, at the height of the display 23 of the television 20. This enables a viewer to easily enjoy a sound having high sound quality and great reality due to a video image and a localized sound image appearing at the same height, without using an extra connection cable.

THIRD EMBODIMENT

In the first and second embodiments, the sound image localization process is uniformly performed on various acoustic signals. However, it is conceivable that different viewers prefer different tones and different sound image heights. In addition, there is a desire to adjust a tone and a sound image height in accordance with contents to be viewed. Therefore, described in the third embodiment is a configuration in which amplitude-frequency characteristics of acoustic signals which are outputted from the AV rack loudspeaker apparatus 10 and the television 20 are controlled in accordance with a view mode inputted by a viewer 4.

Figure 15:
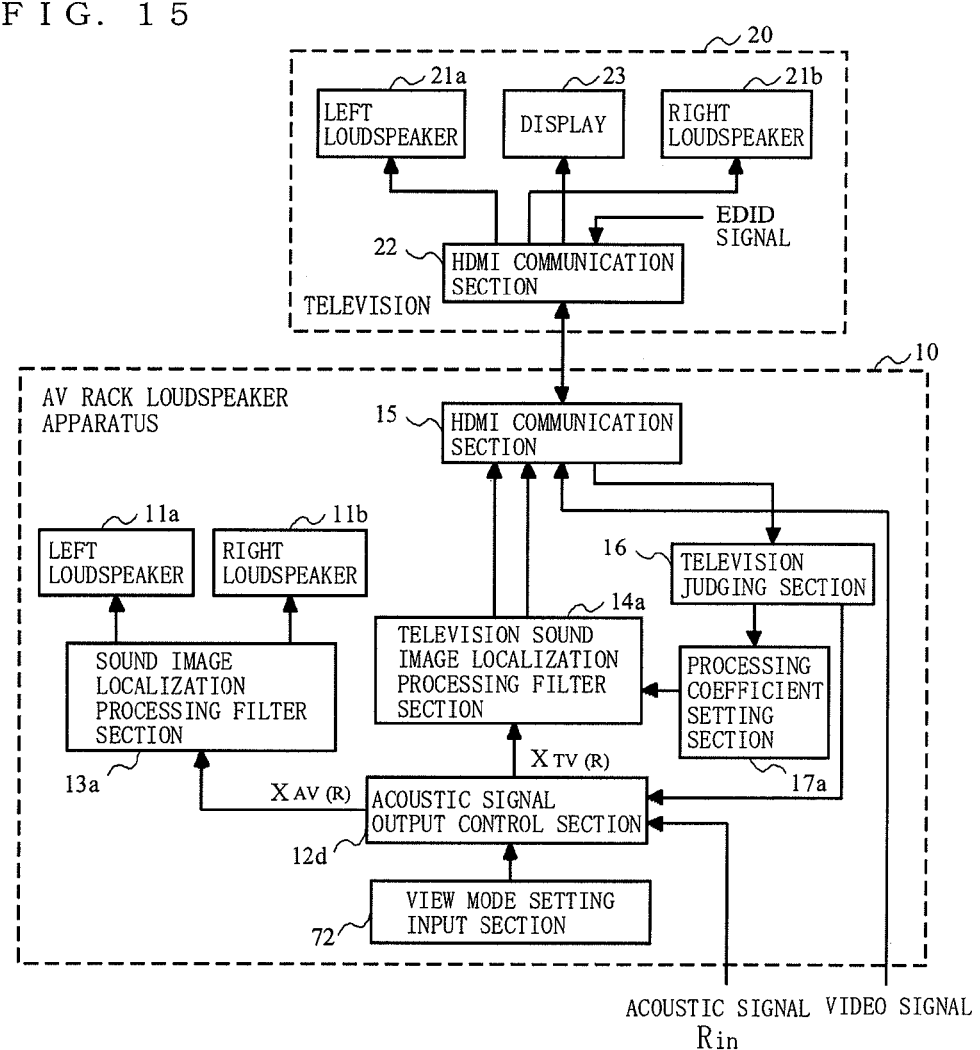
FIG. 15 is a diagram showing a detailed configuration of a video and audio output system according to a third embodiment of the present invention.

FIG. 15 is a diagram showing a detailed configuration of a video and audio output system according to a third embodiment of the present invention. An AV rack loudspeaker apparatus 10 according to the third embodiment includes loudspeakers 11a and 11b, an acoustic signal output control section 12d, a sound image localization processing filter section 13a, a television sound image localization processing filter section 14a, an HDMI communication section 15, a television judging section 16, a processing coefficient setting section 17a, and a view mode setting input section 72. A television 20 includes loudspeakers 21a and 21b, an HDMI communication section 22, and a display 23.

Figure 16:
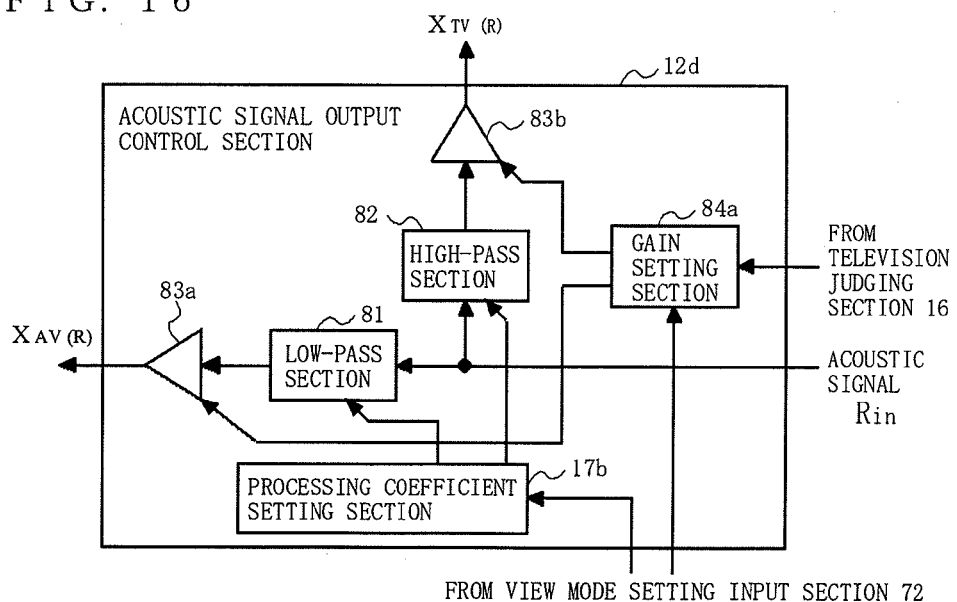
FIG. 16 is a diagram showing a detailed configuration of an acoustic signal output control section 12d.

The AV rack loudspeaker apparatus 10 according to the third embodiment is different from the AV rack loudspeaker apparatus 10 according to the first embodiment described above, in terms of the acoustic signal output control section 12d and the view mode setting input section 72. In the following, the third embodiment will be described focusing mainly on the different points. FIG. 16 is a diagram showing a detailed configuration of the acoustic signal output control section 12d.

The view mode setting input section 72 is for example operation buttons of a remote control. The viewer 4 inputs a command about a tone and a sound image height he/she prefers. Here, no particular limitation is put on a command pattern. However, for example, by preparing in advance, in the view mode setting input section 72, a plurality of view modes such as a "movie mode", a "music mode", a "high sound quality mode", and a "reality mode" which are combination patterns of tones and sound image heights, the viewer 4 can easily give a command about the tone and the sound image height.

The view mode setting input section 72 provides the command inputted from the viewer 4, to the processing coefficient setting section 17b and the gain setting section 84a of the acoustic signal output control section 12d. In accordance with the command inputted by the viewer 4, the processing coefficient setting section 17b sets a boundary frequency between the frequencies that are outputted as audio from the AV rack loudspeaker apparatus 10 and the frequencies that are outputted as audio from the television 20, that is, cutoff frequencies of a low-pass section 81 and a high-pass section 82. In accordance with the command inputted by the viewer 4, the gain setting section 84a provides predetermined gains to variable multiplier units 83a and 83b.

Figure 17:
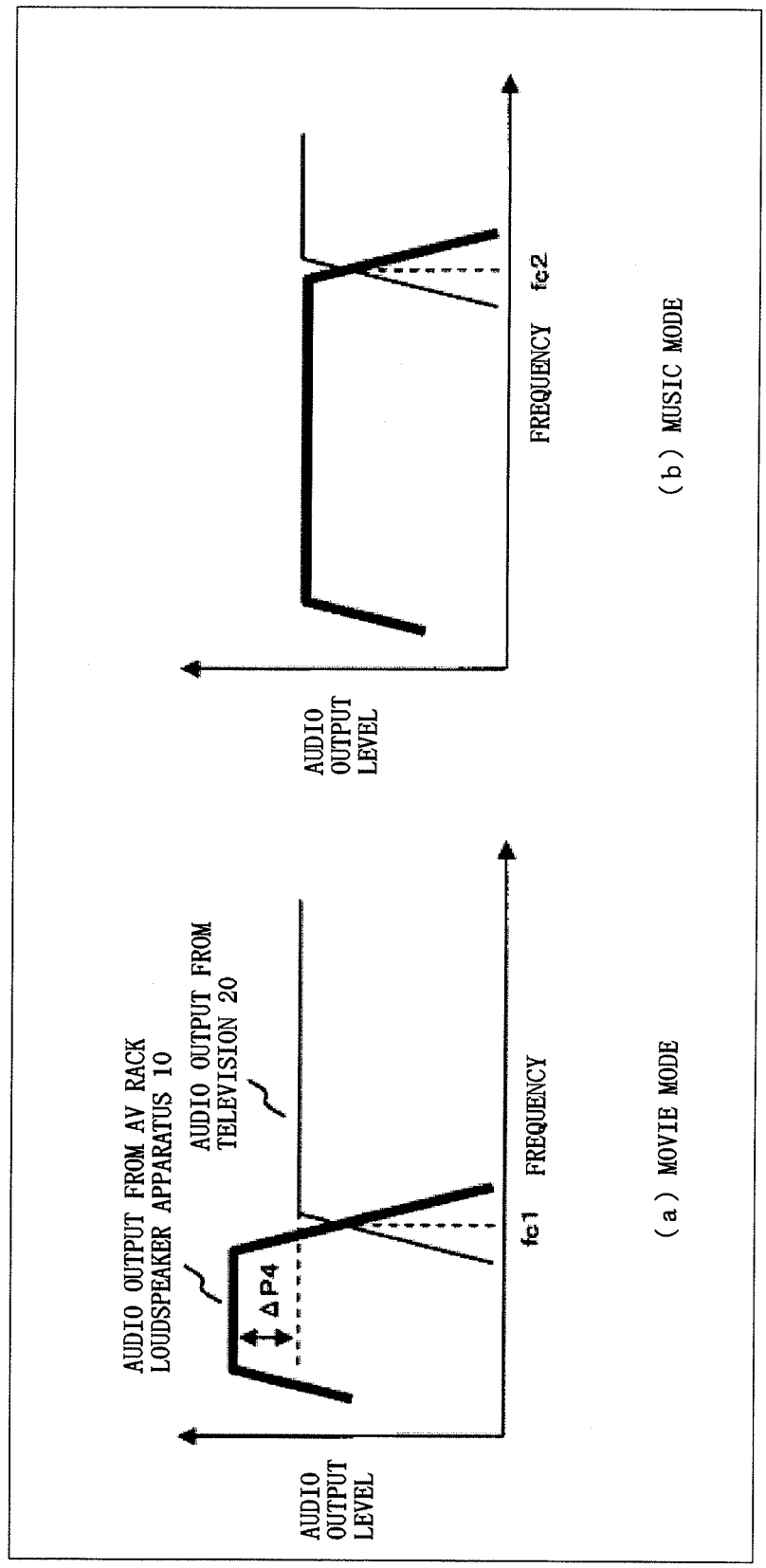
FIG. 17 shows diagrams illustrating exemplary amplitude-frequency characteristics corresponding to audio outputs in different view modes.

Here, a case where the "movie mode" which prioritizes a sense of involvement in video images and the "music mode" which prioritizes a sound quality are set in advance will be described with reference to FIG. 17. A diagram (a) of FIG. 17 shows characteristics in the "movie mode". A cutoff frequency fc1 which constitutes the audio-output boundary is set at a low level in order to increase the sense of involvement in a video image. As a result, a sound image of a wider frequency band component is localized at the height of the television display 23. Moreover, the level of the low-frequency component which is outputted as audio from the AV rack loudspeaker apparatus 10 is set higher than the level in the normal mode by ΔP4. This enables the viewer 4 to hear a sound with enhanced powerfulness. On the other hand, a diagram (b) of FIG. 17 shows characteristics in the "music mode". A cutoff frequency fc2 which constitutes the audio-output boundary is set at a high level. As a result, the AV rack loudspeaker apparatus 10 equipped with the high-sound-quality loudspeakers outputs a wider frequency band as audio. This enables the viewer 4 to hear a sound with higher quality.

As described above, in the video and audio output system according to the third embodiment of the present invention, desired sound effects can be obtained.

The configuration of the third embodiment is applicable to the configuration of the first embodiment as shown in FIG. 15, and of course applicable to the configuration of the second embodiment (FIG. 12) as well.

FOURTH EMBODIMENT

In the above-described first to third embodiments, the sound image localization process for the television 20 is entirely performed in the AV rack loudspeaker apparatus 10. However, this configuration puts all the processing loads on the AV rack loudspeaker apparatus 10. Therefore, in a fourth embodiment described below, the sound image localization process is partially assigned to the television 20 in accordance with a signal processing capacity of the television 20.

Figure 18:
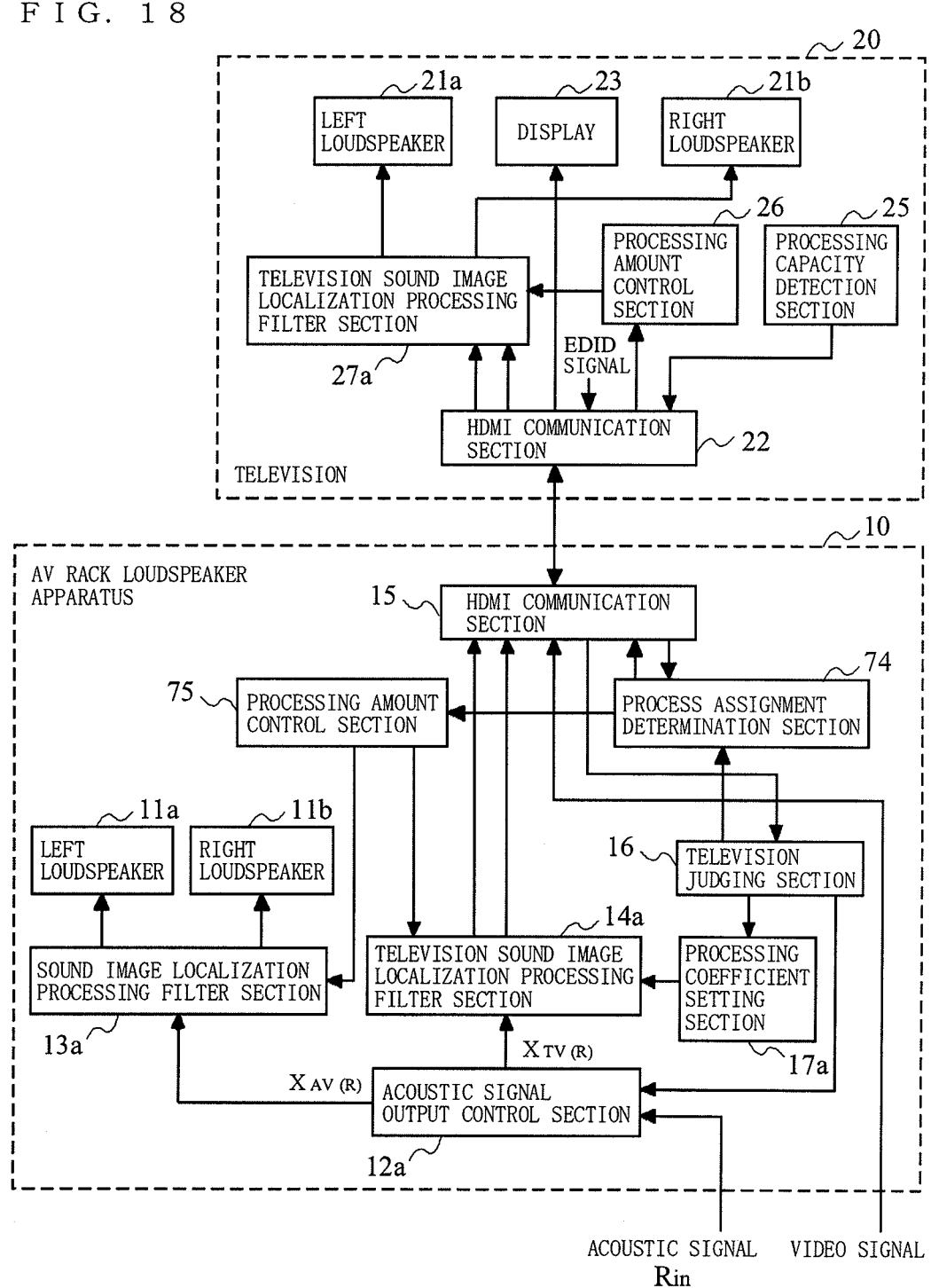
FIG. 18 is a diagram showing a detailed configuration of a video and audio output system according to a fourth embodiment of the present invention.

FIG. 18 is a diagram showing a detailed configuration of a video and audio output system according to a fourth embodiment of the present invention. An AV rack loudspeaker apparatus 10 according to the fourth embodiment includes loudspeakers 11a and 11b, an acoustic signal output control section 12a, a sound image localization processing filter section 13a, a television sound image localization processing filter section 14a, an HDMI communication section 15, a television judging section 16, a processing coefficient setting section 17a, a process assignment determination section 74, and a processing amount control section 75. A television 20 includes loudspeakers 21a and 21b, an HDMI communication section 22, a display 23, a processing capacity detection section 25, a processing amount control section 26, and a television sound image localization processing filter section 27a.

The AV rack loudspeaker apparatus 10 according to the fourth embodiment is different from the AV rack loudspeaker apparatus 10 according to the first embodiment described above, in terms of the process assignment determination section 74 and the processing amount control section 75. The television 20 according to the fourth embodiment is different from the television 20 according to the first embodiment described above, in terms of the processing capacity detection section 25, the processing amount control section 26, and the television sound image localization processing filter section 27a. In the following, the fourth embodiment will be described focusing mainly on the different points.

The processing capacity detection section 25 detects the signal processing capacity of the television 20, which is allocatable to signal processing for sound image localization, and outputs information about the detected processing capacity to the HDMI communication section 22 as a part of a CEC signal. The process assignment determination section 74 determines the amount of signal processing to be performed by the AV rack loudspeaker apparatus 10 and the amount of signal processing to be performed by the television 20, based on an identification signal which is outputted from the television judging section 16 and which indicates a kind of the television 20, and the information about the processing capacity of the television 20 which is inputted via the HDMI communication section 15. Information about the process assignment thus determined is outputted to the processing amount control section 75 and also to the HDMI communication section 15 as a part of a CEC signal.

Based on the process assignment information, the processing amount control section 75 of the AV rack loudspeaker apparatus 10 sets the number of filters and a filter length in the sound image localization processing filter section 13a, and the number of filters and a filter length in the television sound image localization processing filter section 14a. On the other hand, the processing amount control section 26 of the television 20 sets the number of filters and a filter length in the television sound image localization processing filter section 27a, based on the process assignment information received from the AV rack loudspeaker apparatus 10 via the HDMI communication section 22. The television sound image localization processing filter section 27a has the same configuration as that of the television sound image localization processing filter section 14a. For one channel, two FIR filters are used to process an input signal and output the signal to the loudspeakers 21a and 21b.

FIG. 19 is a diagram showing sound image localization process filter sections for low-frequency components, which are processed by the AV rack loudspeaker apparatus 10, for all channels. In FIG. 19, the sound image localization process filter sections 13b to 13f are sound image localization process filter sections for low-frequency components of an L-channel signal, a C-channel signal, an SR-channel signal, an SL-channel signal, and an LFE-channel signal, respectively. Similarly to the sound image localization processing filter section 13a, each of the sound image localization process filter sections 13b to 13f includes two FIR filters. However, in the case of a low-frequency signal at 120 Hz or lower which is usually included in the LFE channel, sound image recognition is difficult and no sound image localization process is required. Therefore, it is desirable that the sound image localization processing filter section 13f includes no FIR filter and performs a through process. The adder 44c adds signals to be outputted as audio from the loudspeaker 11a, among the outputs from the sound image localization processing filter sections 13a to 13f. The adder 44d adds signals to be outputted as audio from the loudspeaker 11b, among the outputs from the sound image localization processing filter sections 13a to 13f. The outputs from the adders 44c and 44d are outputted as audio from the loudspeakers 11a and 11b, respectively. The same applies to the television sound image localization processing filter section 14a as well.

Next, how the process assignment determination section 74 determines the processing amount will be described.

In the process assignment determination section 74, information about the signal processing capacity S1 of the AV rack loudspeaker apparatus 10 is held. To the process assignment determination section 74, moreover, information about the signal processing capacity S2 of the television 20 is inputted from the processing capacity detection section 25 via the HDMI communication sections 22 and 15. The process assignment determination section 74 determines a filter length of each FIR filter which constitutes the sound image localization processing filter section 13a and the television sound image localization processing filter sections 14a and 27a, in such a manner that a signal processing amount required of the sound image localization processing filter section 13a and the television sound image localization processing filter sections 14a and 27a does not exceed S1+S2, and that the greatest possible sound image localization effect can be obtained.

Figure 20:
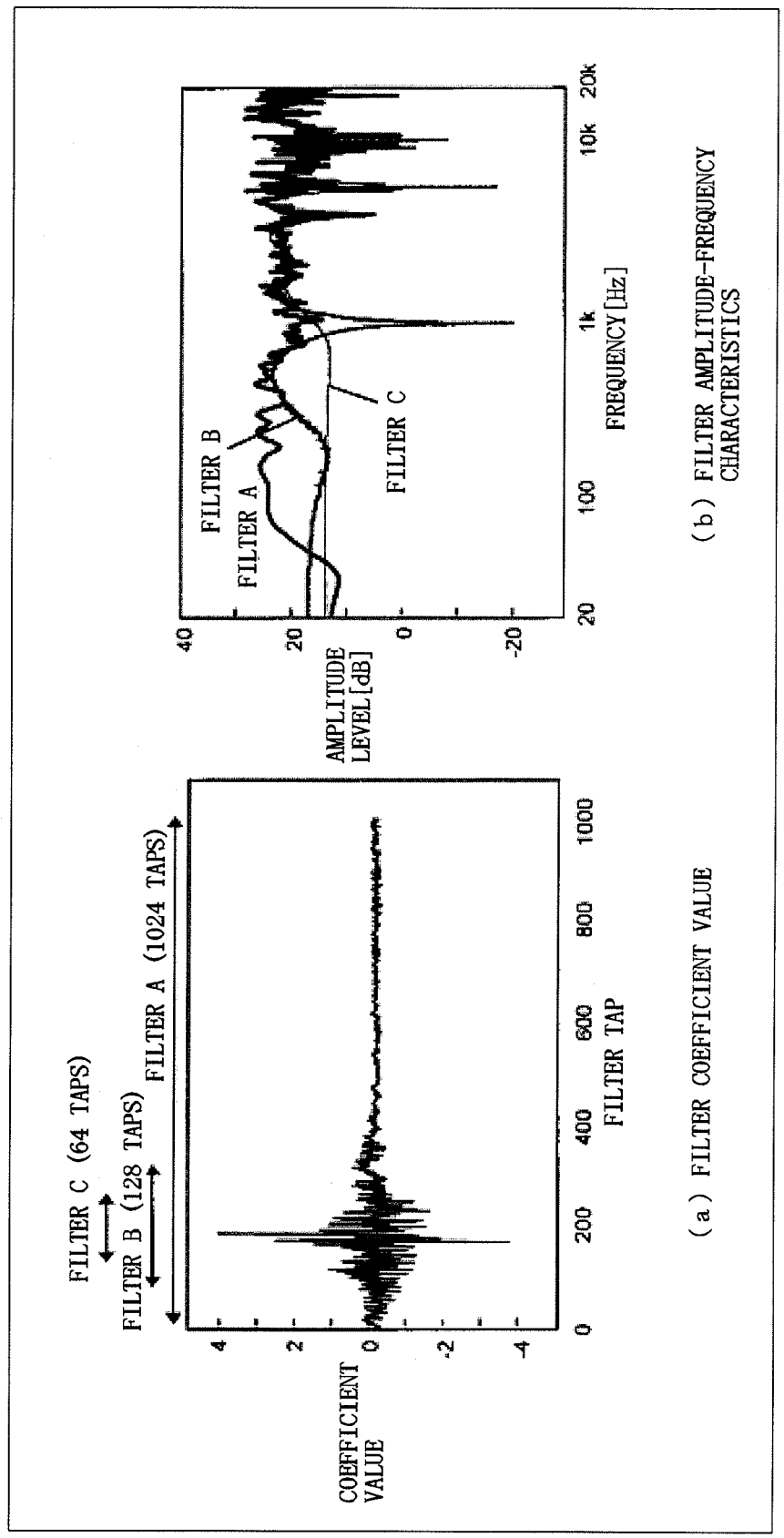
FIG. 20 is graphs showing a relationship between filter lengths of FIR filters and amplitude-frequency characteristics.

FIG. 20 shows a relationship between filter lengths of FIR filters and amplitude-frequency characteristics. A graph (a) of FIG. 20 shows filter coefficient values of FIR filters, and a graph (b) of FIG. 20 shows amplitude-frequency characteristics for filters A, B, and C. The filter A has coefficients corresponding to 1024 taps, among the filter coefficient values shown in the graph (a) of FIG. 20. The filter B has coefficients corresponding to 128 taps centered about the 200th tap at which the coefficient value is large, among the filter coefficient values shown in the graph (a) of FIG. 20. The filter C has coefficients corresponding to 64 taps centered about the 200th tap, among the filter coefficient values shown in the graph (a) of FIG. 20. The shorter a filter coefficient length, that is, a filter length, of an FIR filter is, the smaller the signal processing amount becomes. However, as is clear from the graph (b) of FIG. 20, particularly in lower frequencies, a resolution of the characteristics becomes larger, which lowers the characteristics accuracy. Therefore, when an FIR filter that performs a sound image localization process has a short filter length, there is an advantage that the signal processing amount is small, but on the other hand there is a disadvantage that the characteristic accuracy is lowered particularly in a low frequency band to fail to satisfy Equations 2 and 3 and consequently the sound image localization effect deteriorates.

In the case of the sound image shown in FIG. 9, a problem occurs that the sound image 32b corresponding to the low-frequency recognition or the sound image 31b corresponding to the high-frequency recognition is not localized at the position shown in FIG. 9, but at a position near the loudspeaker that is outputting audio or, in an extreme case, undesirably localized in a viewer's head so that the viewer feels as if a sound is ringing within his/her head. Particularly when, due to a short filter length of the sound image localization processing filter section, a sound image for a surround channel, which is supposed to be localized at the diagonally rear of the viewer 4, is localized near the loudspeaker that is outputting audio, the viewer 4 feels much discomfort and the acoustic reality is considerably impaired.

Figure 21:
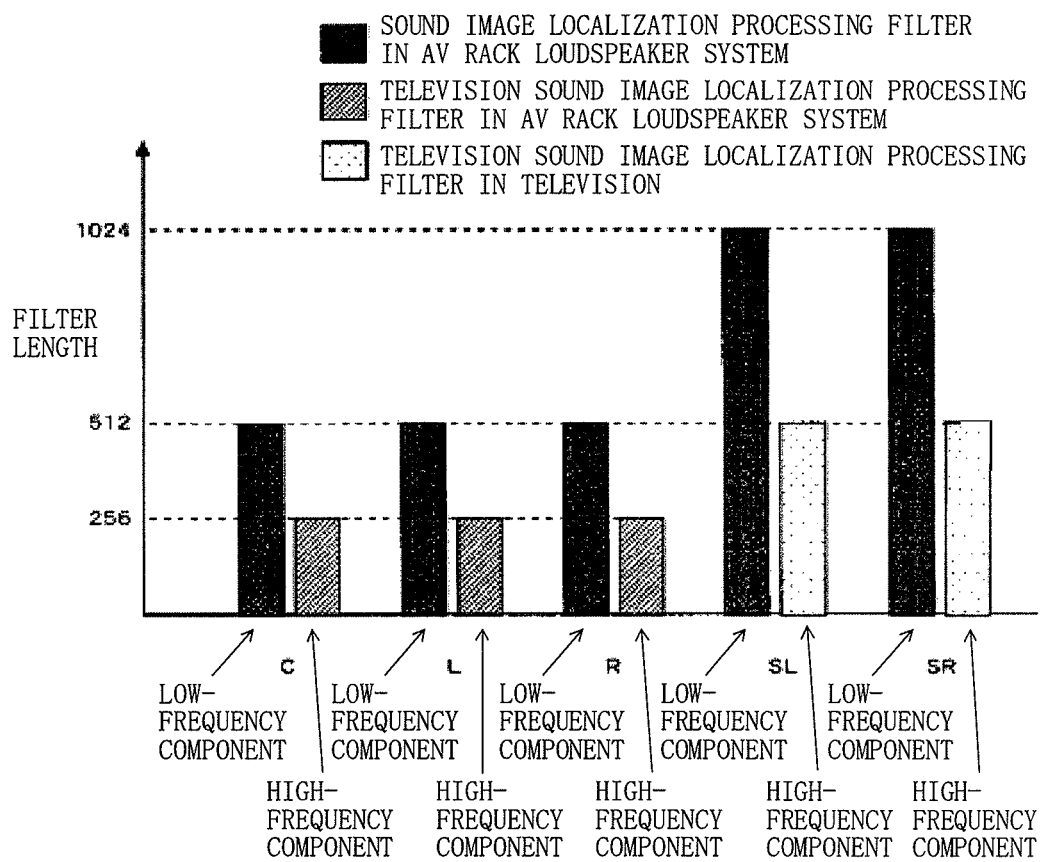
FIG. 21 is a graph showing an example of assignment of a signal process for sound image localization.

The process assignment determination section 74 determines process assignment so as to prioritize the filter length of the FIR filter corresponding to the surround channel over the filter length of the FIR filter corresponding to the front channel, and to prioritize the filter length of the FIR filter corresponding to the low-frequency component over the filter length of the FIR filter corresponding to the high-frequency component. FIG. 21 shows an example of the filter length of each sound image localization processing filter section. In the case of FIG. 21, for example, the sound image localization processing filter sections 13a to 13e of the AV rack loudspeaker apparatus 10 use two 512-tap FIR filters to process low-frequency components of a C-channel signal, an L-channel signal, and an R-channel signal, and use two 1024-tap FIR filters to process low-frequency components of a surround L-channel signal and a surround R-channel signal. The process assignment determination section 74 determines the optimum process assignment in consideration of the number of multiplexable voice data channels defined by the HDMI standard.

In the television 20, on the other hand, a signal processing load imposed on a signal processing circuit such as an LSI varies depending on the kind of broadcast wave received, whether or not optional functions are being used or not, or the like. In accordance with the variation in the signal processing load, the signal processing capacity S2 which is allocatable to signal processing for sound image localization also varies. Thus, the process assignment determination section 74 operates to set a filter length or to select a sound image localization process channel so as to avoid deterioration of the sound image localization effect as much as possible, in accordance with the varying S1+S2.

As described above, in the video and audio output system according to the fourth embodiment of the present invention, the sound image localization process is appropriately assigned to the AV rack loudspeaker apparatus 10 and the television 20 in accordance with the signal processing capacity of the television 20. This enables the viewer to obtain a high sound image localization effect regardless of the kind and operating conditions of the television 20.

The configuration of the fourth embodiment is applicable to the configuration of the first embodiment as shown in FIG. 18, and of course applicable to the configuration of the second embodiment (FIG. 12) and the configuration of the third embodiment (FIG. 15) as well.

As shown in the graph (b) of FIG. 20, as the filter length becomes shorter, the amplitude-frequency characteristics tend to show attenuation of the amplitude level particularly in a low frequency range. Therefore, a configuration may be acceptable in which a gain for the variable multiplier unit 83a included in the acoustic signal output control section 12a is increased in accordance with the filter length to thereby cover the deficiency in the amplitude level thus lowered. Alternatively, a configuration may be acceptable in which an equalizer filter having the variable amplitude-frequency characteristics is used in place of the variable multiplier unit 83a so that the amplitude characteristics of the equalizer filter are varied depending on the filter length to thereby cover the deficiency in the amplitude level thus lowered.

In contents of the 5.1 channel sound, usually, a component forming the sound effect or the like is assigned to the surround channel, and the surround channel makes a smaller contribution to the integration of the sound and the video image, which is achieved by the sound image localization, than the front channel does. Accordingly, with respect to the surround channel, no frequency division may be performed, and all the frequency components subjected to the sound image localization process may be outputted as audio only from the AV rack loudspeaker apparatus 10, or alternatively all the frequency components subjected to the sound image localization process may be outputted as audio only from the television 20.

OTHER EMBODIMENTS

The descriptions of the first to fourth embodiments are on the assumption that the volume of the AV rack loudspeaker apparatus 10 and the volume of the television 20 are balanced. However, each of the AV rack loudspeaker apparatus 10 and the television 20 has the volume setting function in order that the viewer can select a desired volume.

In the present invention, sounds outputted from the respective loudspeakers have different frequency bands. Thus, when a volume is changed in the AV rack loudspeaker apparatus 10 or the television 20 independently of each other, imbalance in the audio output level occurs and the sound quality deteriorates. Therefore, needed is some approach for keeping the balance in the audio output level between the AV rack loudspeaker apparatus 10 and the television 20 regardless of the volume setting inputted by the viewer 4.

Figure 22:
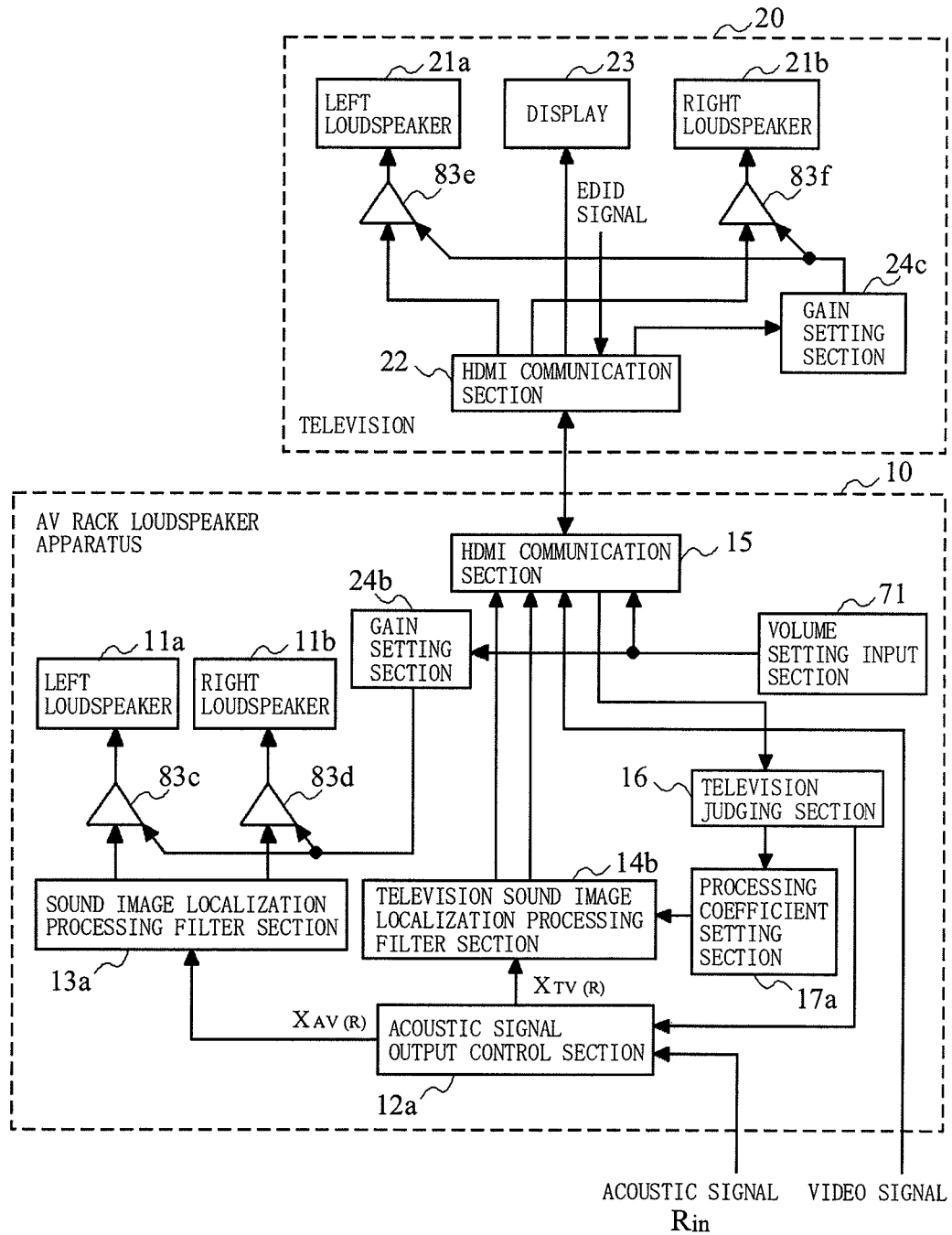
FIG. 22 is a diagram showing a detailed configuration of a video and audio output system according to another embodiment of the present invention.
Figure 23:
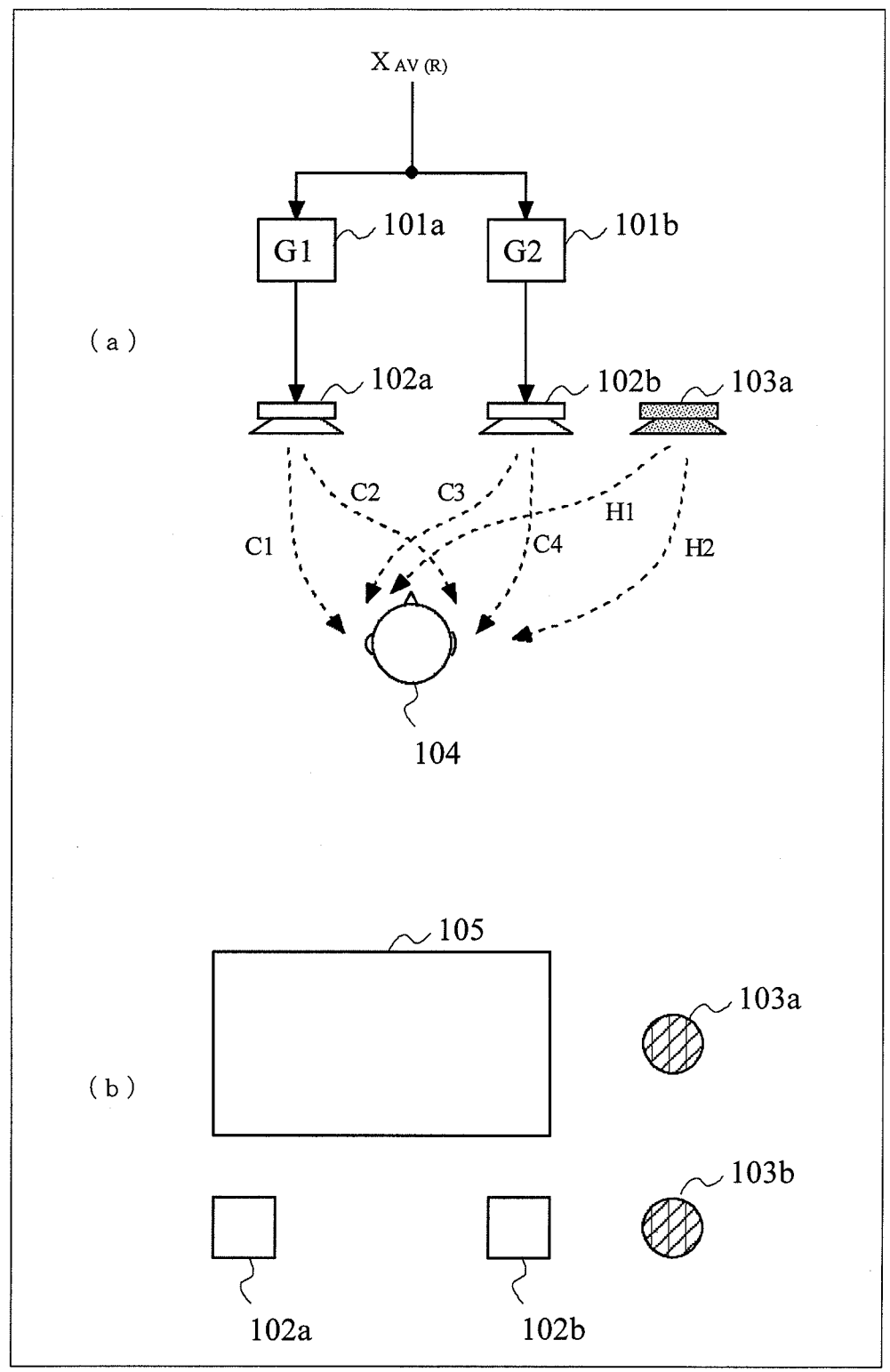
FIG. 23 shows diagrams illustrating a configuration of a conventional sound image localization process, and HR transfer functions.
Figure 24:
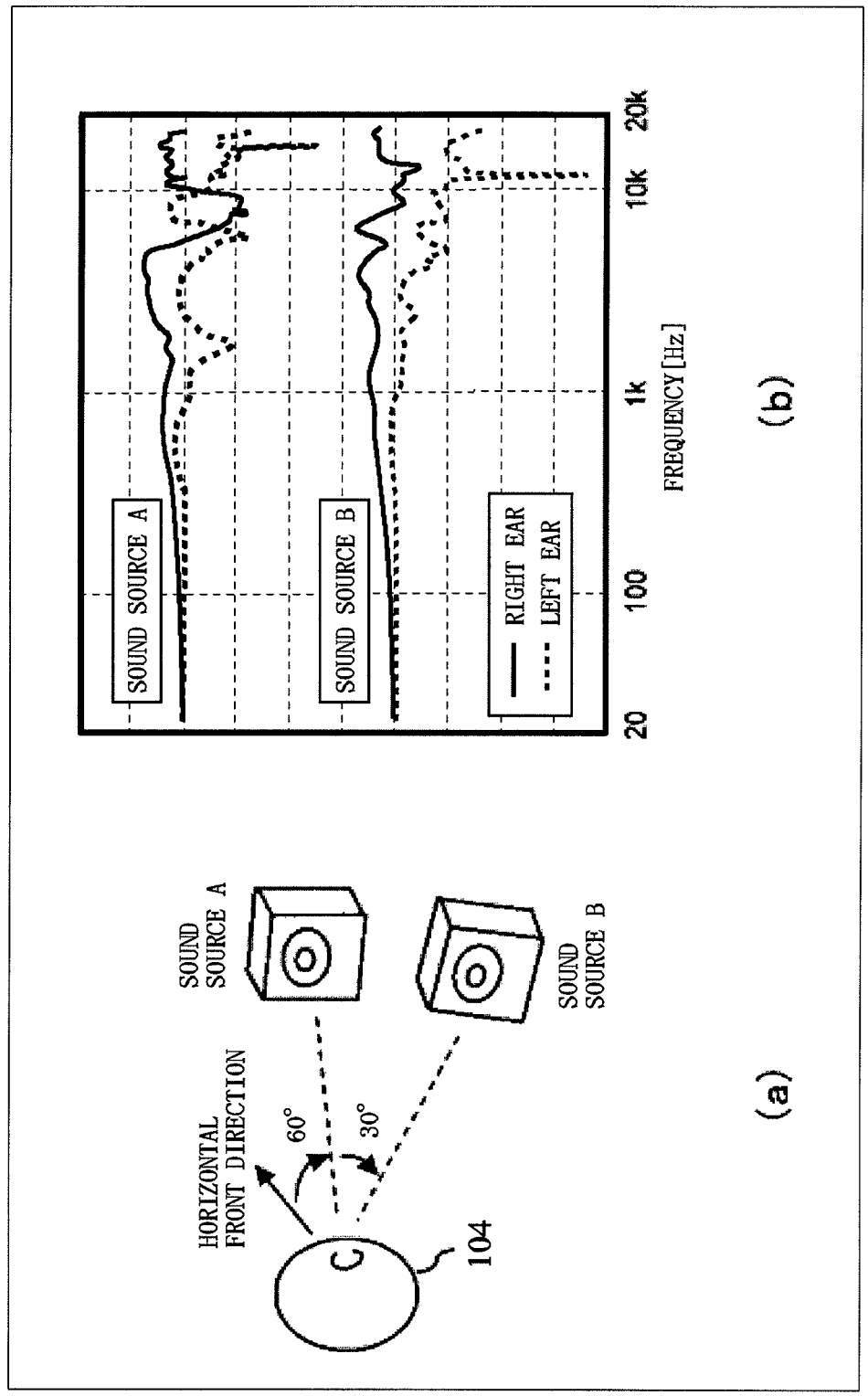
FIG. 24 shows diagrams illustrating HR transfer functions of sound sources placed at different heights.
Figure 25:
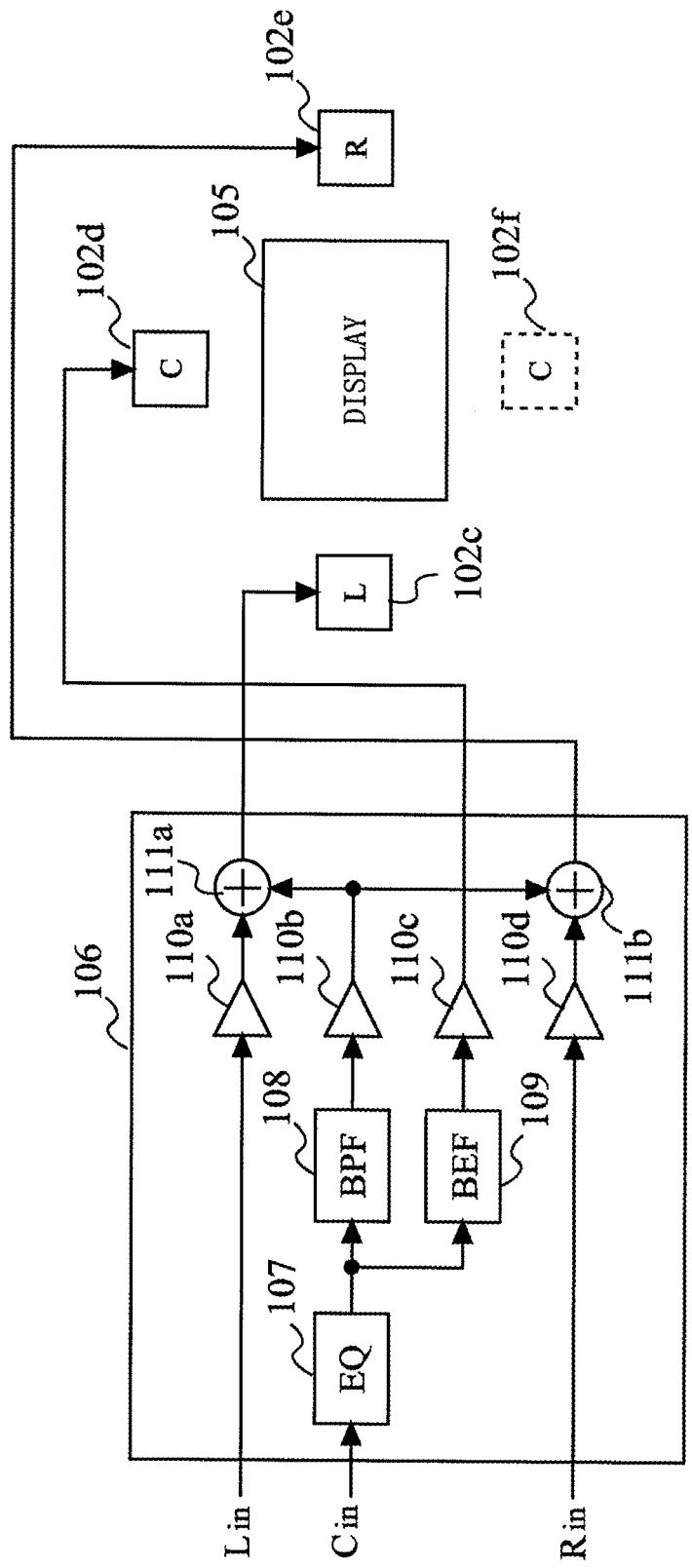
FIG. 25 is a diagram showing an exemplary configuration of a conventional sound image localization processing circuit.

FIG. 22 shows an example of a configuration for the approach. In this example, a volume setting input section 71 in an AV rack loudspeaker apparatus 10 controls the volume. When a command to change the volume is inputted by the viewer 4 to the volume setting input section 71, a gain setting section 24b controls gains for variable multiplier units 83c and 83d. The command to change the volume is also outputted to a gain setting section 24c via HDMI communication sections 15 and 22. The gain setting section 24c controls gains for variable multiplier units 83e and 83f in accordance with the command to change the volume.

An object to be controlled in accordance with the command to change the volume is not limited to a gain of an analog signal inputted to the loudspeaker. In addition, the volume setting input section 71 may be provided in a television 20.

The video and audio output system of the present invention is applicable to when a video image and a localized sound image are desired to appear at the same height, and the like.

The invention claimed is:

1. A video and audio output system comprising:
an audio output device; and
a video and audio output device placed above the audio output device, for outputting an acoustic signal so as to localize a sound image of the acoustic signal at a predetermined position,
wherein
the audio output device comprises:
an acoustic signal output control section for dividing the acoustic signal into a low-frequency-component acoustic signal in which a high-frequency-component is attenuated and a high-frequency-component acoustic signal in which a low-frequency-component is attenuated;
a first sound image localization processing filter section for performing a sound image localization process on the low-frequency-component acoustic signal;
a plurality of first loudspeakers for outputting a plurality of low-frequency-component acoustic signals which are outputted from the first sound image localization processing filter section;
a second sound image localization processing filter section for performing a sound image localization process on the high-frequency-component acoustic signal; and
a first communication section for transmitting, to the video and audio output device, a plurality of high-frequency-component acoustic signals which are outputted from the second sound image localization processing filter section, and
the video and audio output device comprises:
a second communication section for receiving the plurality of high-frequency-component acoustic signals which are transmitted from the audio output device;
a plurality of second loudspeakers for outputting the plurality of high-frequency-component acoustic signals; and
a video display section for displaying a video signal thereon,
the low-frequency-component acoustic signal at least includes a frequency component of 1 kHz or lower, and
the high-frequency-component acoustic signal at least includes a frequency component of 4 kHz or higher.

2. The video and audio output system according to claim 1, wherein
the acoustic signal output control section includes:
a low-pass filter for allowing only the low-frequency-component acoustic signal among the acoustic signals to pass therethrough; and
a high-pass filter for allowing only the high-frequency-component acoustic signal among the acoustic signals to pass therethrough.

3. The video and audio output system according to claim 2, wherein
the audio output device further comprises a judging section for judging a kind of the video and audio output device based on information obtained from the video and audio output device, and
the acoustic signal output control section controls a level of the low-frequency-component acoustic signal having passed through the low-pass filter and a level of the high-frequency-component acoustic signal having passed through the high-pass filter, based on a result of judgment of the judging section.

4. The video and audio output system according to claim 3, wherein the first sound image localization processing filter section controls the sound image localization process, based on a result of judgment of the judging section.

5. The video and audio output system according to claim 3, wherein the second sound image localization processing filter section controls the sound image localization process on the high-frequency-component acoustic signal having passed through the high-pass filter by using a coefficient calculated based on a result of judgment of the judging section.

6. The video and audio output system according to claim 2, wherein
the audio output device further comprises a view mode input section for inputting a view mode reflecting a viewer's preference, and
the acoustic signal output control section controls a cutoff frequency of the low-pass filter, a level of the low-frequency-component acoustic signal having passed through the low-pass filter, a cutoff frequency of the high-pass filter, and a level of the high-frequency-component acoustic signal having passed through the high-pass filter, based on the view mode inputted to the view mode input section.

7. The video and audio output system according to claim 1, wherein the audio output device further comprises a volume setting input section for inputting a volume value set by a viewer, and controls a level of the low-frequency-component acoustic signal, which is to be inputted to each of the first loudspeakers, based on the volume value inputted to the volume setting input section.

8. The video and audio output system according to claim 7, wherein the video and audio output device obtains, from the audio output device, the volume value inputted to the volume setting input section, and controls a level of the high-frequency-component acoustic signal, which is to be inputted to each of the second loudspeakers, based on the volume value inputted to the volume setting input section.

9. The video and audio output system according to claim 1, wherein
the audio output device further comprises:
a process assignment determination section for determining assignment between an amount of sound image localization process to be performed by the audio output device and an amount of sound image localization process to be performed by the video and audio output device, based on a signal processing capacity allocatable to signal processing for sound image localization, which is obtained from the video and audio output device; and
a first processing amount control section for controlling the sound image localization process performed by the first sound image localization processing filter section, in accordance with the assignment determined by the process assignment determination section, and
the video and audio output device further comprises:
a third sound image localization processing filter section for performing the sound image localization process on the high-frequency-component acoustic signal received by the second communication section, and outputting the signal to each of the plurality of second loudspeakers; and a second processing amount control section for controlling the sound image localization process performed by the third sound image localization processing filter section, in accordance with the assignment determined by the process assignment determination section which is provided by the audio output device.

10. A video and audio output system, comprising:
an audio output device; and
a video and audio output device placed above the audio output device, for outputting an acoustic signal so as to localize a sound image of the acoustic signal at a predetermined position, wherein
the audio output device comprises:
   a first sound image localization processing filter section for performing a sound image localization process on the acoustic signal;
   a plurality of acoustic signal output control sections corresponding to a plurality of acoustic signals outputted by the first sound image localization processing filter section, the acoustic signal output control sections being configured to divide the acoustic signals into low-frequency-component acoustic signals in which a high-frequency-component is attenuated and high-frequency-component acoustic signals in which a low-frequency-component is attenuated;
   a plurality of first loudspeakers for outputting a plurality of the low-frequency-component acoustic signals which are extracted by the plurality of acoustic signal output control sections, respectively; and
   a first communication section for transmitting, to the video and audio output device, a plurality of the high-frequency-component acoustic signals which are extracted by the plurality of acoustic signal output control sections, respectively, and
the video and audio output device comprises:
   a second communication section for receiving the plurality of the high-frequency-component acoustic signals which are transmitted from the audio output device;
   a plurality of second loudspeakers for outputting the plurality of the high-frequency-component acoustic signals; and
   a video display section for displaying a video signal thereon,
the low-frequency-component acoustic signal at least includes a frequency component of 1 kHz or lower, and
the high-frequency-component acoustic signal at least includes a frequency component of 4 kHz or higher.

11. The video and audio output system according to claim 10, wherein
each of the plurality of acoustic signal output control sections includes:
   a low-pass filter for allowing only the low-frequency-component acoustic signal among the acoustic signals to pass therethrough; and
   a high-pass filter for allowing only the high-frequency component acoustic signal among the acoustic signals to pass therethrough.

12. The video and audio output system according to claim 11, wherein
the audio output device further comprises a judging section for judging a kind of the video and audio output device based on information obtained from the video and audio output device, and
each of the plurality of acoustic signal output control sections controls a level of the low-frequency-component acoustic signal having passed through the low-pass filter and a level of the high-frequency-component acoustic signal having passed through the high-pass filter, based on a result of judgment of the judging section.

13. The video and audio output system according to claim 12, wherein the first sound image localization processing filter section controls the sound image localization process, based on a result of judgment of the judging section.

14. The video and audio output system according to claim 12, wherein the second sound image localization processing filter section controls the sound image localization process on the high-frequency-component acoustic signal having passed through the high-pass filter by using a coefficient calculated based on a result of judgment of the judging section.

15. The video and audio output system according to claim 11, wherein
the audio output device further comprises a view mode input section for inputting a view mode reflecting a viewer's preference, and
each of the plurality of acoustic signal output control sections controls a cutoff frequency of the low-pass filter, a level of the low-frequency-component acoustic signal having passed through the low-pass filter, a cutoff frequency of the high-pass filter, and a level of the high-frequency-component acoustic signal having passed through the high-pass filter, based on the view mode inputted to the view mode input section.

16. The video and audio output system according to claim 10, wherein the audio output device further comprises a volume setting input section for inputting a volume value set by a viewer, and controls a level of the low-frequency-component acoustic signal, which is to be inputted to each of the first loudspeakers, based on the volume value inputted to the volume setting input section.

17. The video and audio output system according to claim 16, wherein the video and audio output device obtains, from the audio output device, the volume value inputted to the volume setting input section, and controls a level of the high-frequency-component acoustic signal, which is to be inputted to each of the second loudspeakers, based on the volume value inputted to the volume setting input section.

18. The video and audio output system according to claim 10, wherein
the audio output device further comprises:
   a process assignment determination section for determining assignment between an amount of sound image localization process to be performed by the audio output device and an amount of sound image localization process to be performed by the video and audio output device, based on a signal processing capacity allocatable to signal processing for sound image localization, which is obtained from the video and audio output device; and
   a first processing amount control section for controlling the sound image localization process performed by the first sound image localization processing filter section, in accordance with the assignment determined by the process assignment determination section, and
the video and audio output device further comprises:
   a second sound image localization processing filter section for performing the sound image localization process on the high-frequency-component acoustic signal received by the second communication section, and outputting the signal to each of the plurality of second loudspeakers; and
   a second processing amount control section for controlling the sound image localization process performed by the second sound image localization processing filter section, in accordance with the assignment determined by the process assignment determination section which is provided by the audio output device.

* * * * *